(12) United States Patent
Zhou et al.

(10) Patent No.: US 12,122,015 B2
(45) Date of Patent: *Oct. 22, 2024

(54) GRINDING WHEEL APPARATUS, GRINDING WHEEL CUTTING APPARATUS AND CUTTING METHOD

(71) Applicants: Biam Alloys Co., Ltd., Beijing (CN); Jiuma Automatic Machinery (Shanghai) Co., Ltd., Shanghai (CN)

(72) Inventors: Xiafei Zhou, Beijing (CN); Hongbo Li, Beijing (CN); Gang Liu, Beijing (CN); Yu Meng, Beijing (CN)

(73) Assignees: BIAM ALLOYS CO., LTD., Beijing (CN); Jiuma Automatic Machinery (Shanghai) Co., Ltd., Shanghai (CN)

( * ) Notice: Subject to any disclaimer, the term of this patent is extended or adjusted under 35 U.S.C. 154(b) by 102 days.

This patent is subject to a terminal disclaimer.

(21) Appl. No.: 17/599,543

(22) PCT Filed: Mar. 30, 2020

(86) PCT No.: PCT/CN2020/082176
§ 371 (c)(1),
(2) Date: Sep. 28, 2021

(87) PCT Pub. No.: WO2020/192795
PCT Pub. Date: Oct. 1, 2020

(65) Prior Publication Data
US 2022/0143782 A1 May 12, 2022

(30) Foreign Application Priority Data
Mar. 28, 2019 (CN) .......................... 201910245665.1

(51) Int. Cl.
*B24B 49/12* (2006.01)
*B24B 27/06* (2006.01)

(52) U.S. Cl.
CPC .......... *B24B 49/12* (2013.01); *B24B 27/0675* (2013.01)

(58) Field of Classification Search
CPC ..... B24B 49/12; B24B 27/0675; B24B 27/06; B24B 41/04; B24B 41/002; B24B 45/006;
(Continued)

(56) References Cited

U.S. PATENT DOCUMENTS 3,138,308 A 6/1964 Oakley
3,473,435 A 10/1969 Tse et al.
(Continued)

FOREIGN PATENT DOCUMENTS

CN 2335741 Y 9/1999
CN 1370649 A 9/2002
(Continued)

OTHER PUBLICATIONS

International search report issued for counterpart Chinese patent application No. PCT/CN2020/082176 mailed on Jun. 29, 2020.
(Continued)

*Primary Examiner* — David S Posigian
*Assistant Examiner* — Michael A Gump
(74) *Attorney, Agent, or Firm* — Hamilton, Brook, Smith & Reynolds, P.C.

(57) ABSTRACT

The present disclosure provides a grinding wheel apparatus comprising a grinding wheel, a flange, a pull rod and a spindle. The grinding wheel is mounted on one side of the flange, and the other side of the flange is a tapered bucket, the tapered bucket has a buckle slot. The pull rod passes through the spindle, and a pull rod head of the pull rod is fixed to one end of the spindle, the tapered bucket is inserted into the spindle from the other end of the spindle, and the buckle slot is engaged with the T-shaped buckle of the pull rod in the spindle to fix the flange on which the grinding
(Continued)

wheel is mounted to the other end of the spindle. The present disclosure further provides a grinding wheel cutting apparatus comprising the grinding wheel apparatus, and a cutting method using the grinding wheel cutting apparatus.

8 Claims, 20 Drawing Sheets

(58) Field of Classification Search
CPC ....... B24B 45/00; B24B 45/003; B24B 51/00; B24B 47/10; B24B 47/12; B24B 5/04; B24B 5/042; B24B 5/047; B24B 5/038; B24B 5/42; B28D 5/0029; B28D 5/022; B28D 5/023; B28D 5/024; B28D 5/025; B28D 5/026; B28D 1/04; B28D 1/047; B28D 1/227; B28D 1/24; B24D 5/16
USPC ............................................................ 451/5
See application file for complete search history.

(56) References Cited

U.S. PATENT DOCUMENTS

| | | | |
|---|---|---|---|
| 4,238,718 A | | 12/1980 | Wepner et al. |
| 4,677,792 A | * | 7/1987 | Speidel .................. B27B 5/325 |
| | | | 279/2.03 |
| 4,697,800 A | | 10/1987 | Stahl et al. |
| 4,841,682 A | | 6/1989 | Waelti |
| 5,315,789 A | | 5/1994 | Takashi |
| 5,894,771 A | | 4/1999 | Bruan et al. |
| 6,041,491 A | | 3/2000 | Ishikawa et al. |
| 6,144,892 A | | 11/2000 | Cheetham et al. |
| 7,431,682 B2 | * | 10/2008 | Zeiler ..................... B24B 23/00 |
| | | | 83/72 |
| 2002/0003883 A1 | | 4/2002 | Castronovo |
| 2002/0038830 A1 | | 4/2002 | Castronovo |
| 2005/0227598 A1 | * | 10/2005 | Ploeger .................. B24B 23/02 |
| | | | 451/359 |
| 2006/0172669 A1 | * | 8/2006 | Hesse .................. B24B 23/028 |
| | | | 451/359 |
| 2008/0254725 A1 | * | 10/2008 | Henning ................ B24B 23/02 |
| | | | 451/510 |
| 2010/0016359 A1 | | 7/2010 | DeClark et al. |
| 2010/0163592 A1 | | 7/2010 | Declark et al. |
| 2012/0125168 A1 | | 5/2012 | O'Keefe et al. |
| 2015/0042052 A1 | * | 2/2015 | Furusawa ............... B23B 31/10 |
| | | | 279/141 |
| 2018/0290264 A1 | | 10/2018 | Li |
| 2019/0210177 A1 | * | 7/2019 | Graves .................... B24B 55/02 |
| 2022/0143776 A1 | | 5/2022 | Liu et al. |
| 2022/0143782 A1 | | 5/2022 | Zhou et al. |
| 2022/0152773 A1 | | 5/2022 | Zhou et al. |

FOREIGN PATENT DOCUMENTS

| | | | | |
|---|---|---|---|---|
| CN | 1824459 | A | | 8/2006 |
| CN | 101311854 | A | | 11/2008 |
| CN | 201366494 | Y | | 12/2009 |
| CN | 202317943 | A | | 7/2012 |
| CN | 102658399 | A | | 9/2012 |
| CN | 102729289 | A | | 10/2012 |
| CN | 202556217 | U | | 11/2012 |
| CN | 102873624 | A | | 1/2013 |
| CN | 202921926 | U | | 5/2013 |
| CN | 102101163 | B | | 6/2013 |
| CN | 103317447 | A | | 9/2013 |
| CN | 103949684 | A | | 7/2014 |
| CN | 203917998 | U | | 11/2014 |
| CN | 104835753 | A | | 8/2015 |
| CN | 104889863 | A | | 9/2015 |
| CN | 105772655 | A | * | 7/2016 |
| CN | 106061680 | A | | 10/2016 |
| CN | 205968552 | U | | 2/2017 |
| CN | 106737081 | A | | 5/2017 |
| CN | 106826546 | A | | 6/2017 |
| CN | 206415734 | U | * | 8/2017 |
| CN | 107116440 | A | | 9/2017 |
| CN | 206475018 | U | | 9/2017 |
| CN | 107253111 | A | | 10/2017 |
| CN | 107378505 | A | | 11/2017 |
| CN | 107790659 | A | | 3/2018 |
| CN | 108097721 | A | | 6/2018 |
| CN | 108687637 | A | * | 10/2018 |
| CN | 110103124 | A | | 8/2019 |
| CN | 110103125 | A | | 8/2019 |
| CN | 110170908 | A | | 8/2019 |
| CN | 110170909 | A | | 8/2019 |
| CN | 209737296 | U | | 12/2019 |
| CN | 209774303 | U | | 12/2019 |
| CN | 209868256 | U | | 12/2019 |
| CN | 2019737296 | U | | 12/2019 |
| CN | 209954420 | U | | 1/2020 |
| CN | 210081416 | U | | 2/2020 |
| EP | 2516109 | B1 | * | 9/2013 ............... B24B 1/00 |
| JP | 59187452 | A | | 10/1984 |
| JP | S62130151 | A | | 6/1987 |
| JP | H09207020 | A | | 8/1997 |
| JP | 2011088194 | A | | 5/2011 |
| JP | 2018186190 | A | | 11/2018 |
| KR | 101827201 | B1 | | 2/2018 |

OTHER PUBLICATIONS

Partial Supplementary European Search Report issued on Nov. 18, 2022 in counterpart European patent application No. 20776669.2.
Extended European Search Report issued Feb. 15, 2023 for European patent application No. 20776669.2 (PCT/CN2020082176).
Extended European Search Report issued Feb. 27, 2023 for European patent application No. 20776809.4 (PCT/CN2020082181).
Chinese First Office Action for Chinese Application No. 201910245665. 1, Dated: Apr. 14, 2023, 7 pages (With English Translation).
Chinese Search Report for Chinese Application No. 201910245665. 1, Dated: Apr. 12, 2023, 6 pages (With English Translation).
Chinese Search Report issued for Application No. 201910245701.4, dated Aug. 8, 2023.
Chinese Office Action issued for Application No. 201910245701.4, dated Aug. 10, 2023.
Extended European Search Report issued on Nov. 17, 2022 in EP Application No. 20777877.0.
International Search Report for International Application No. PCT/CN2020/082178, entitled "Automatic Chuck Device, Grinding Wheel Cutting Apparatus, and Cutting Method," mailed Jul. 2, 2020 (English Translation).
Chinese Office Action for Application No. 201910244955.4, entitled "Grinding Wheel Cutting Apparatus and Cutting Method," issued on Dec. 5, 2023.
Chinese National Intellectual Property Administration Search Report for Application No. 201910244955.4, entitled "Grinding Wheel Cutting Apparatus and Cutting Method," issued Nov. 30, 2023.
Partial Supplementary European Search Report issued on Nov. 8, 2022 in European Application No. 20776809.4.
Notice of Allowance issued for U.S. Appl. No. 17/599,533, entitled "Grinding Wheel Cutting Apparatus and Cutting Method," dated Oct. 24, 2023.
Non-Final Office Action issued for U.S. Appl. No. 17/599,533, entitled "Grinding Wheel Cutting Apparatus and Cutting Method," dated Jun. 20, 2023.
Chinese National Intellectual Property Administration Search Report for application No. 201910244955.4, filed Mar. 28, 2019.
Chinese Office Action for application No. 201910244955.4, titled "Grinding Wheel Cutting Apparatus and Cutting Method", dated Apr. 13, 2023.
International Preliminary Report on Patentability received for PCT Patent Application No. PCT/CN2020/082176, mailed on Oct. 7, 2021, 12 pages (6 pages of English Translation and 6 pages of Original Document).
International Preliminary Report on Patentability received for PCT Patent Application No. PCT/CN2020/082178, mailed on Oct. 7, 2021, 12 pages (6 pages of English Translation and 6 pages of Original Document).

(56) References Cited

OTHER PUBLICATIONS

International Preliminary Report on Patentability received for PCT Patent Application No. PCT/CN2020/082181, mailed on Oct. 7, 2021, 12 pages (6 pages of English Translation and 6 pages of Original Document).
Notice of Allowance received for U.S. Appl. No. 17/599,533, mailed on Feb. 29, 2024, 11 pages.
Requirement for Restriction/Election received for U.S. Appl. No. 17/599,542, mailed on Feb. 14, 2024, 6 pages.
Notice of Allowance received for U.S. Appl. No. 17/599,533, mailed on Jun. 6, 2024, 2 pages.
Non-Final Office Action received for U.S. Appl. No. 17/599,542, entitled "Automatic Chuck Apparatus, Grinding Wheel Cutting Apparatus and Cutting Method" mailed on May 20, 2024, 8 pages.
Supplemental Notice of Allowance received for U.S. Appl. No. 17/599,533, entitled "Grinding Wheel Cutting Apparatus and Cutting Method" mailed on Jun. 6, 2024, 6 pages.
Supplemental Notice of Allowance received for U.S. Appl. No. 17/599,533, entitled "Grinding Wheel Cutting Apparatus and Cutting Method" mailed on Jun. 17, 2024, 6 pages.

* cited by examiner

GRINDING WHEEL APPARATUS, GRINDING WHEEL CUTTING APPARATUS AND CUTTING METHOD

This application is the U.S. National Stage of International Application No. PCT/CN2020/082176, filed Mar. 30, 2020, which designates the U.S., published in Chinese, and claims priority under 35 U.S.C. § 119 or 365(c) to Chinese Application No. 201910245665.1, filed Mar. 28, 2019.

TECHNICAL FIELD

The present disclosure relates to cutting workpieces, more specifically to a grinding wheel apparatus, a grinding wheel cutting apparatus and a cutting method.

BACKGROUND

Grinding wheels, with the advantages in quick, accurate and neat cutting, are widely used in cutting rod workpieces. The grinding wheels are commonly used in various cutting apparatuses, especially cutting apparatuses for cutting high-hardness materials such as high-temperature alloys.

The grinding wheel of the conventional cutting apparatus is mounted on a spindle (i.e., a drive spindle) of the cutting apparatus. A motor or other power device of the cutting apparatus drives the spindle to rotate at high speed, and the grinding wheel mounted on the spindle rotates at high speed with the spindle to cut rod workpieces.

However, the grinding wheel of the conventional cutting apparatus is usually mounted to the drive spindle by nuts or other connectors. When replacing the grinding wheel, it is necessary to loosen the nut fastening the grinding wheel with a spanner, take off the grinding wheel, mount a new grinding wheel, and then fasten the nuts with the spanner. In fastening the nuts, it is necessary to hold the spindle by hand to prevent it from rotating. As a result, the conventional grinding wheel structure is inefficient in replacement. There is a need in the art for a more efficient replacement and mounting of the grinding wheel.

SUMMARY

To improve the efficiency in mounting and replacing the grinding wheel, an embodiment of the present disclosure provides a grinding wheel apparatus, comprising a grinding wheel, a flange, a pull rod and a spindle.

The grinding wheel is mounted on one side of the flange, and the other side of the flange is a tapered bucket. The tapered bucket has a buckle slot, and an end of the pull rod includes a T-shaped buckle through which the pull rod is matched with the buckle slot of the tapered bucket.

The pull rod passes through the spindle, and a pull rod head of the pull rod is fixed to one end of the spindle, the tapered bucket is inserted into the spindle from the other end of the spindle, and the buckle slot is engaged with the T-shaped buckle of the pull rod in the spindle to fix the flange on which the grinding wheel is mounted to the other end of the spindle.

In an embodiment of the present disclosure, the grinding wheel is connected to one side of the flange by a thread connection.

In an embodiment of the present disclosure, the grinding wheel apparatus further comprises a grinding wheel pressing plate with an internal thread. The one side of the flange includes an end portion having an external thread to match the internal thread of the grinding wheel pressing plate, and the grinding wheel is connected to the one side of the flange by the grinding wheel pressing plate.

In an embodiment of the present disclosure, the pull rod head is fixed to one end of the spindle by bolts.

In an embodiment of the present disclosure, at least one spring is provided between the pull rod head and the spindle.

It is another aspect of the present disclosure to provide a grinding wheel cutting apparatus comprising the aforesaid grinding wheel apparatus, with a transmission device of the grinding wheel apparatus driving the spindle of the grinding wheel apparatus to rotate the grinding wheel.

It is another aspect of the present disclosure to provide a grinding wheel cutting apparatus comprising a first laser distance sensor, a master controller and the aforementioned grinding wheel apparatus, wherein the first laser distance sensor is communicatively coupled to the master controller, wherein the laser distance sensor is configured to obtain an outer diameter of a rod workpiece;

the master controller is configured to transmit the obtained outer diameter of the rod workpiece to an external device, and receive a segment length of a segment to be cut off from the rod workpiece which is determined by the external device based on the obtained outer diameter, a material density of the rod workpiece and a segment weight;

the master controller is configured to perform a control to circularly cut the rod workpiece by the grinding wheel, according to the segment length.

In an embodiment of the present disclosure, the grinding wheel cutting apparatus further comprises a second laser distance sensor configured to obtain a cut depth of the rod workpiece.

It is another aspect of the present disclosure to provide a rod workpiece cutting method for cutting a rod workpiece with the aforementioned grinding wheel cutting apparatus, comprising:

determining a material density of a to-be-cut rod workpiece and a segment weight according to a user instruction;

obtaining an outer diameter of the rod workpiece;

determining a segment length based on the outer diameter, the material density of the rod workpiece and the segment weight; and cutting the rod workpiece according to the segment length.

In an embodiment of the present disclosure, the method further comprises:

obtaining a cut depth of the rod workpiece; and determining a compensation depth for the next cut based on the obtained cut depth and a prescribed compensation algorithm.

With the grinding wheel apparatus and the cutting apparatus provided by the present disclosure, the grinding wheel is mounted on the flange at a designated position by a jig, and the grinding wheel is mounted into the tapered hole of the spindle together with the flange. So the flange and the grinding wheel can be replaced rapidly, thereby shortening the replacement time of the grinding wheel of the cutting apparatus, reducing the labor intensity of operators, and eliminating the potential safety hazards.

The above and additional objects, features and advantages of the present disclosure will be apparent from the following detailed descriptions of preferred embodiments in conjunction with the drawings.

BRIEF DESCRIPTION OF DRAWINGS

For clear illustration of the embodiments in the present disclosure or the prior art, a brief description of the drawings for the embodiments or the prior art will be given below. Obviously, the drawings described below involve only some embodiments of this disclosure. For those of ordinary skilled in the art, other drawings can be derived from these drawings without any inventive efforts. In the drawings.

DESCRIPTION OF EMBODIMENTS

A clear and complete description of the embodiments of the present disclosure will be set forth with reference to the drawings. Obviously, the described embodiments are only a part, rather than all, of the embodiments of the present disclosure. All other embodiments derived by persons skilled in the art from the embodiments of the present disclosure without making inventive efforts shall fall within the scope of the present disclosure.

A complete description of the specific embodiments and the operation principle of the present disclosure will be set forth with reference to the accompanying specification and drawings. It should be appreciated that the scope of the present invention is not limited to this disclosure. Any improvements, modifications and alternations made by those skilled in the art without departing from the concepts and principles of this disclosure shall fall within the scope of the claims.

The features described and/or shown in an embodiment can be applied to one or more other embodiments in a same or similar manner, and can be combined with features in other embodiments or replace features in other embodiments.

The term "comprise" and "include" refer to the existence of a feature, part, step or member, and are not meant to exclude existence or addition of one or more other features, parts, steps or assemblies.

Figure 25:
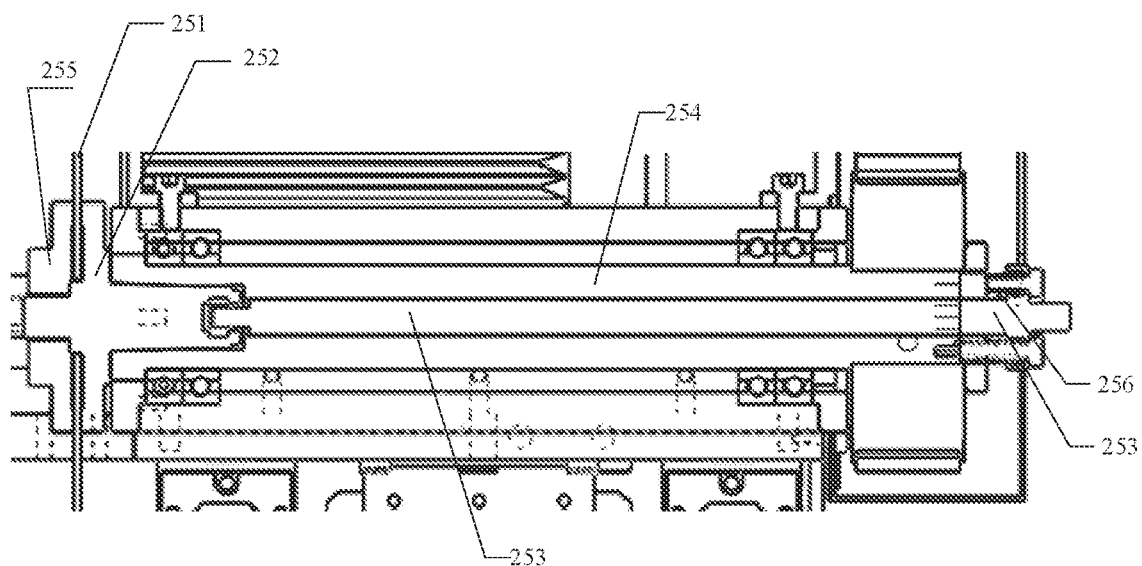
FIG. 25 is a schematic diagram of a grinding wheel apparatus in an embodiment of the present disclosure.

The present disclosure provides a grinding wheel apparatus, as shown in FIG. 25, the grinding wheel apparatus may comprise a grinding wheel 251, a flange 252, a pull rod 253, and a spindle 254. The grinding wheel 251 may be mounted on one side of the flange 252, and the other side of the flange 252 may be a tapered bucket. The tapered bucket may have a buckle slot, and the end of the pull rod may have a T-shaped buckle through which the pull rod is matched with the buckle slot of the tapered bucket.

Figure 26:
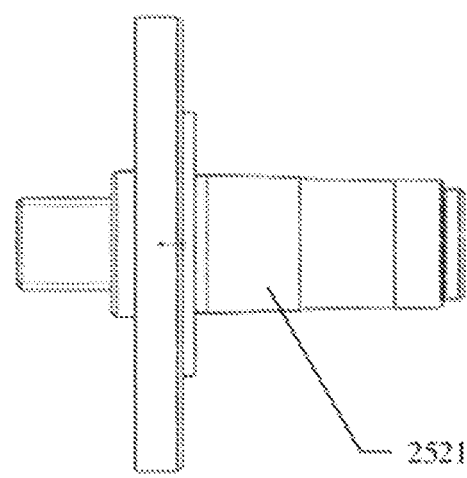
FIG. 26 is a side view of a flange in an embodiment of the present disclosure.
Figure 27:
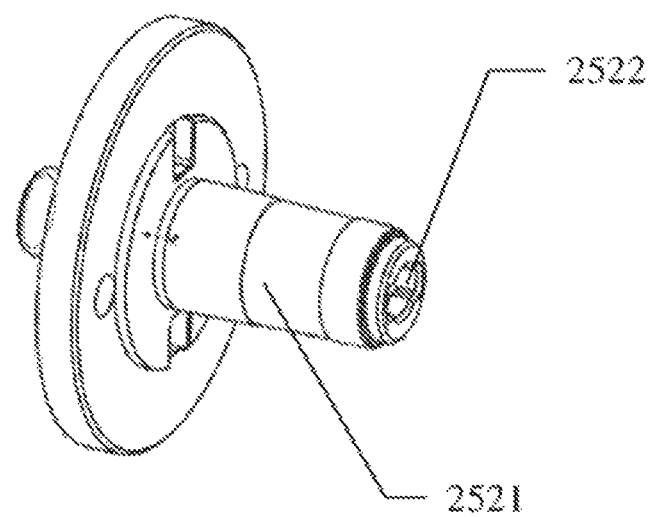
FIG. 27 is a schematic diagram of the flange in an embodiment of the present disclosure.

As shown in FIGS. 26 and 27, which are respectively a side view and a schematic diagram of the flange 252 in an embodiment of the present disclosure, the flange 252 has a tapered bucket 2521, and the end of the tapered bucket 2521 has a buckle slot 2522 matched with the T-shaped buckle of the pull rod.

Figure 28:
FIG. 28 is a side view of a pull rod in an embodiment of the present disclosure.
Figure 29:
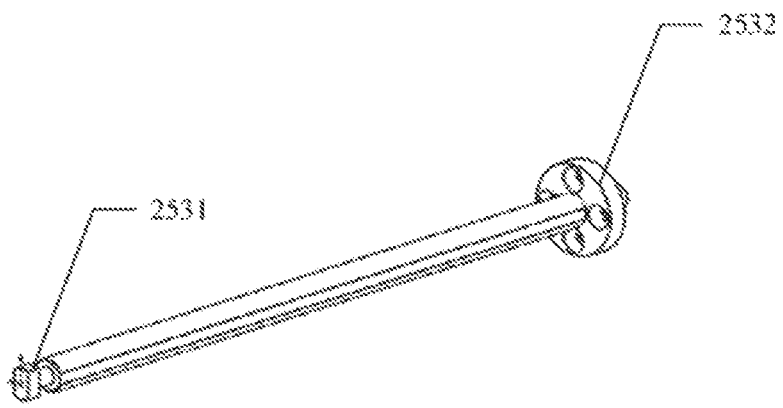
FIG. 29 is a schematic diagram of the pull rod in an embodiment of the present disclosure.

As shown in FIGS. 28 and 29, which are respectively a side view and a schematic diagram of the pull rod 253 in an embodiment of the present disclosure, the end of the pull rod is provided with a T-shaped buckle 2531 through which the pull rod is matched with the buckle slot 2522 of the tapered bucket.

The pull rod 253 may pass through the spindle, and a pull rod head 2532 may be fixed to one end of the spindle. In an embodiment of the present disclosure, the pull rod head may be fixed to one end of the spindle by bolts. At least one spring 256 may be arranged between the pull rod head and the spindle. In the embodiment shown in FIGS. 28 and 29, four bolts fix the pull rod to the spindle through threaded holes 2533, and the bolts pass through the spring 256, so that the spring is arranged between the pull rod head and the spindle, and the flange is pulled by the spring and the pull rod to ensure the stability of the grinding wheel during cutting operation.

The tapered bucket 2521 may be inserted into the spindle from the other end of the spindle, so the buckle slot is engaged with the T-shaped buckle of the pull rod in the spindle, thereby fixing the flange on which the grinding wheel is mounted to the other end of the spindle.

In an embodiment of the disclosure, the grinding wheel may be connected to one side of the flange by a thread connection.

In an embodiment of the present disclosure, as shown in FIG. 25, the grinding wheel apparatus may further comprise a grinding wheel pressing plate 255 with internal thread. The flange 252 may be provided with an end portion 2523 having an external thread to match the internal thread of the grinding wheel pressing plate 255. The grinding wheel may be connected to one side of the flange by the grinding wheel pressing plate 255.

In an embodiment of the disclosure, when disassembling the grinding wheel apparatus, the head of the pull rod is pushed by a hydraulic cylinder to separate the flange from the spindle while rotating the pull rod. With this arrangement, the flange and the grinding wheel can be replaced rapidly.

An embodiment of the present disclosure provides a grinding wheel cutting apparatus with the aforesaid grinding wheel apparatus. A transmission device of the grinding wheel cutting apparatus drives the spindle of the grinding wheel apparatus and therefore rotate the grinding wheel to cut.

In another aspect of the disclosure, it is provided a grinding wheel cutting apparatus, which may comprise a first laser distance sensor, a master controller, and a grinding wheel, and the first laser distance sensor may be communicatively coupled to the master controller.

The laser distance sensor may be configured to obtain an outer diameter of a rod workpiece.

The master controller may be configured to determine a segment length of a segment to be cut off from the rod workpiece based on the outer diameter of the rod workpiece, a material density of the rod workpiece and a segment weight of the segment.

The master controller may be configured to perform a control to circularly cut the rod workpiece with the grinding wheel according to the segment length.

In an embodiment of this disclosure, the grinding wheel cutting apparatus may further comprises a second laser distance sensor for obtaining a cut depth of the rod workpiece.

The cutting and blanking of a master alloy rod workpiece are determined according to a required material weight for the subsequent precision casting process or pulverizing process. The conventional method for cutting a master alloy rod workpiece is fixed-length cutting, in which a cut-off length is determined by taking the material density of the master alloy rod workpiece into account and assuming the outer diameter of the rod workpiece to be constant, and the master alloy rod workpiece is cut at the fixed cut-off length. However, in practical application, even the master alloy rod workpieces produced in the same batch and the same furnace may be inconsistent due to the uneven ingot mold sizes and the processing for eliminating defects on the cast surface, with a ±2 mm error in the outer diameter of the master alloy rod workpiece from the nominal one. The error in outer diameter will cause unconformity of weight of the cut-off segment to the subsequent precision casting or pulverizing process, and in turn waste of the master alloy material or insufficient shrinkage compensation of the cast piece.

The grinding wheel cutting apparatus of the present disclosure provides a fixed-weight cutting approach, in which an outer diameter of a rod workpiece to be cut is measured by a laser distance finder (i.e., a laser distance sensor) while the rod workpiece is locked and held stable, and a cut-off length of the rod workpiece is determined based on the outer diameter, a material density of the rod workpiece and a required weight. That is, the cut-off length is determined by the following equation:

$$L = G / [\rho * (d/2)^2 * \pi]$$

Wherein L denotes the cut-off length; d denotes the outer diameter measured by the laser distance sensor; G denotes segment weight set by a user, i.e., the required weight; ρ denotes the material density of the rod workpiece; and π denotes circumference ratio.

The master alloy rod workpiece usually has a number of grinding and dressing spots. In order to avoid measurement error of the outer diameter of the master alloy rod workpiece, in an embodiment of the disclosure, the rod workpiece is rotated by a rotation apparatus while measured by the laser distance sensor, so as to obtain a set of outer diameters. The set of out diameters are averaged to obtain an accurate outer diameter d.

Figure 1:
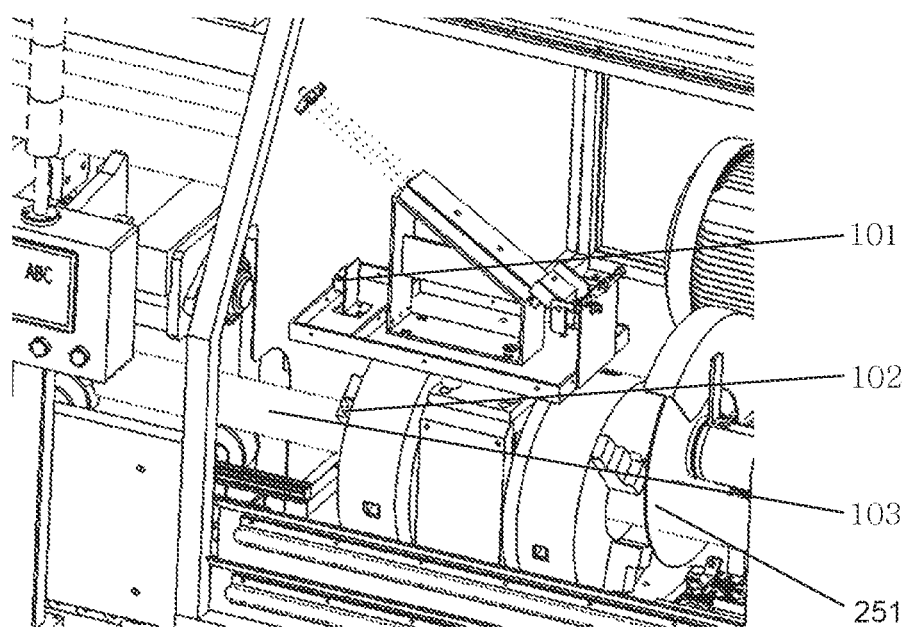
FIG. 1 is a schematic diagram of the grinding wheel cutting apparatus in an embodiment of the present disclosure.

As shown in FIG. 1, which is a schematic diagram of the grinding wheel cutting apparatus according to an embodiment of the present disclosure, an upper laser distance finder 101 measures an outer diameter of a rod workpiece 103 which is locked and held stable by a chuck 102. A master controller 104 determines a segment length of a segment to be cut off from the rod workpiece based on the outer diameter of the rod workpiece, a pre-stored density of the rod workpiece and a preset segment weight of the segment. The grinding wheel cutting apparatus cuts the rod workpiece according to the segment length.

There are two methods for removing the oxide scale of the master alloy rod workpiece, in which the rod workpiece skinned by a lathe usually has a good roundness and the rod workpiece skinned by a roller mill may have a slightly elliptical shape. In an embodiment of this disclosure, when measuring the outer diameter of the master alloy rod workpiece skinned by the lathe, it may be rotated by 45°, and for the master alloy rod workpiece skinned by the roller mill, it may be rotated by 90°.

Figure 2:
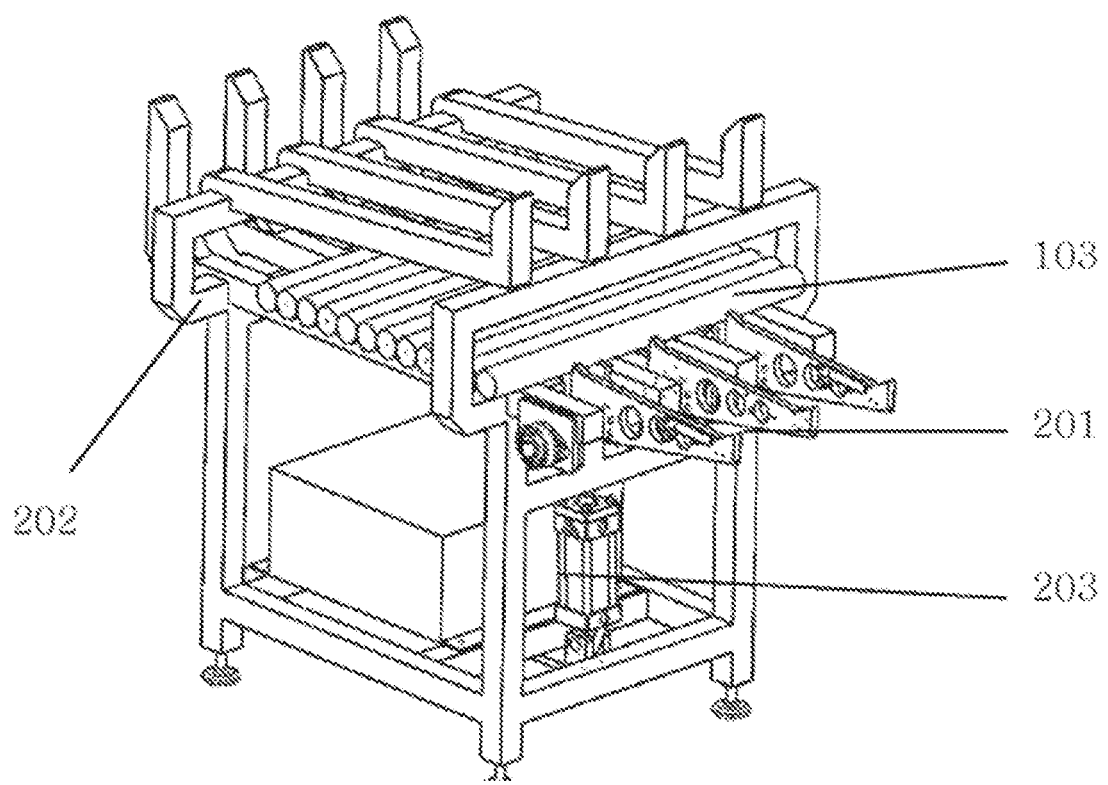
FIG. 2 is a schematic diagram of a feeder in an embodiment of the present disclosure.
Figure 3:
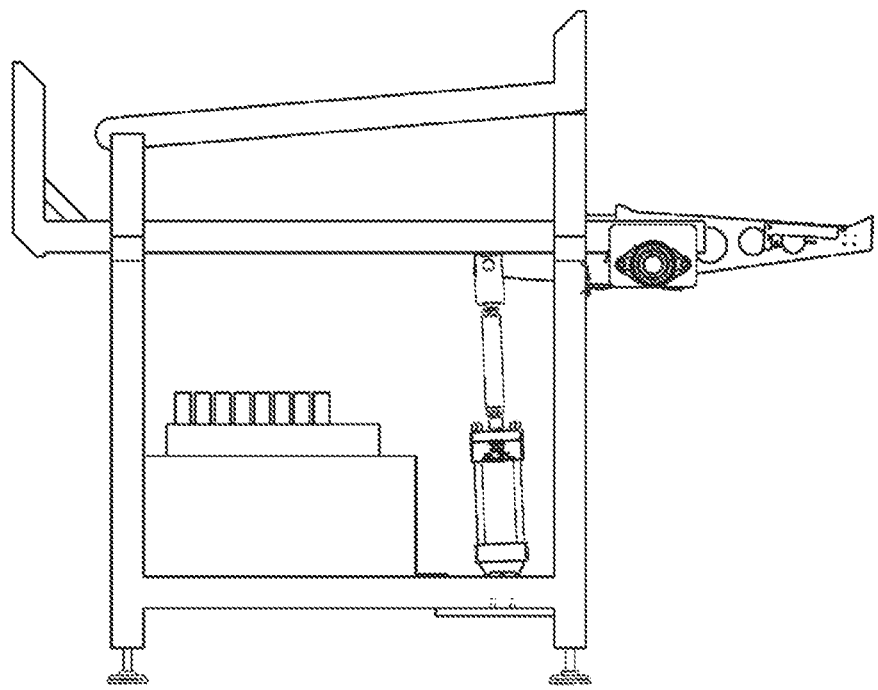
FIG. 3 is a side view of an automatic feeder in an embodiment of the present disclosure.

In an embodiment of the disclosure, the grinding wheel cutting apparatus may further comprise an automatic feeder, as shown in FIG. 2. The automatic feeder may comprise a swing arm 201, a rack platform 202 and a cylinder 203. The rack platform 202 may be configured to store rod workpieces to be cut, and the cylinder 203 may be configured to control the swing arm 202 to extract the rod workpiece 103 and feed it to the cutting apparatus for processing. FIG. 3 is a side view of the automatic feeder in the embodiment.

Figure 4:
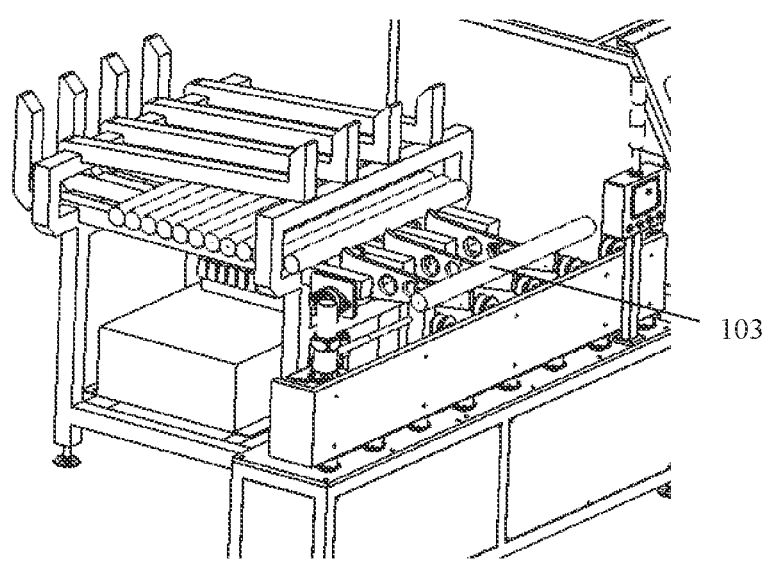
FIG. 4 is a schematic diagram of an embodiment of the present disclosure.

In an embodiment of the disclosure, as shown in FIG. 4, a plurality of rod workpieces are placed on the rack platform, and a platform surface of the rack platform in this embodiment has an inclination angle of 5° with respect to the horizontal plane. However, the inclination angle is not limited to this value. The rod workpieces on the platform surface roll to a front end of the swing arm by gravity, and the cylinder drives the swing arm to swing and place one of the rod workpieces to a feeding station.

Figure 5:
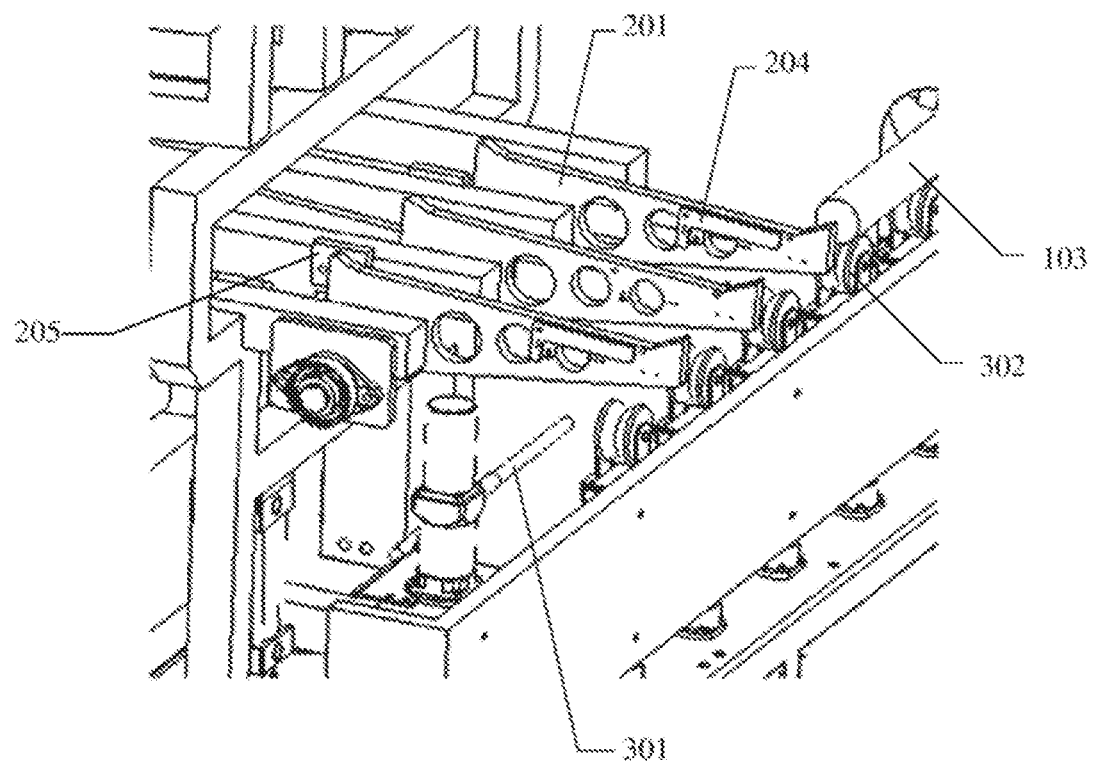
FIG. 5 is a schematic diagram of an embodiment of the present disclosure.

As shown in FIG. 5, after the rod workpieces are placed on the rack platform, one of the rod workpieces to be cut is fed by controlling the swing arm 201 to ascend and descend, and other rod workpieces on the rack platform 202 are blocked from rolling down by a stopper block 205. A push rod 301 of the grinding wheel cutting apparatus pushes the rod workpiece into an automatic chuck (not shown in the figure) at the front end of the cutting apparatus, and the chuck locks the rod workpiece and rotates by 45° or 90°.

Figure 6:
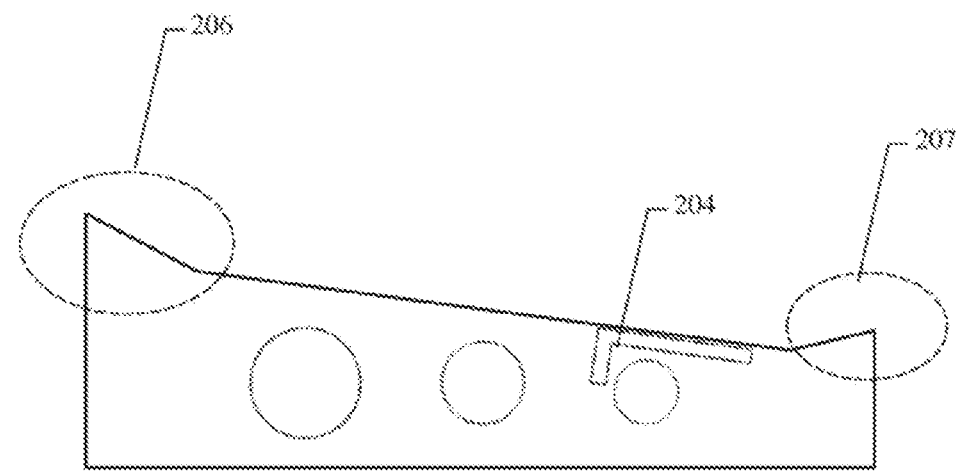
FIG. 6 is a side view of a swing arm in an embodiment of the present disclosure.

As shown in FIG. 6, which is a side view of the swing arm in an embodiment of the disclosure. The swing arm may be provided with a L-shaped stopper link 204 and V-shaped structures 206, 207 at both ends of the swing arm. In this embodiment, the L-shaped stopper link 204 and the V-shaped structure 207 prevent the rod workpiece 103 from rolling back and forth when the rod workpiece 103 reaches a feeding roller 302, and the V-shaped structure 206 extracts a rod workpiece when the swing arm swings.

Figure 7:
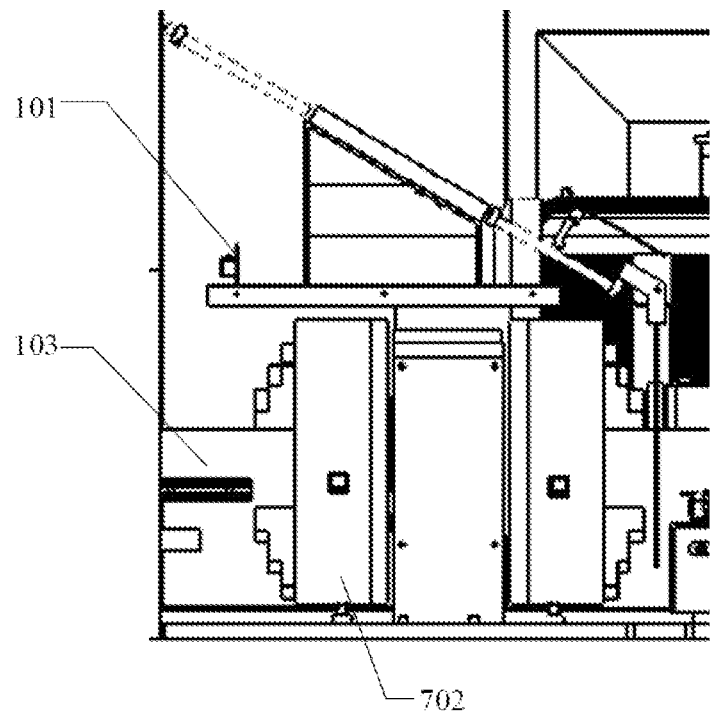
FIG. 7 is a schematic diagram of an embodiment of the present disclosure.
Figure 8:
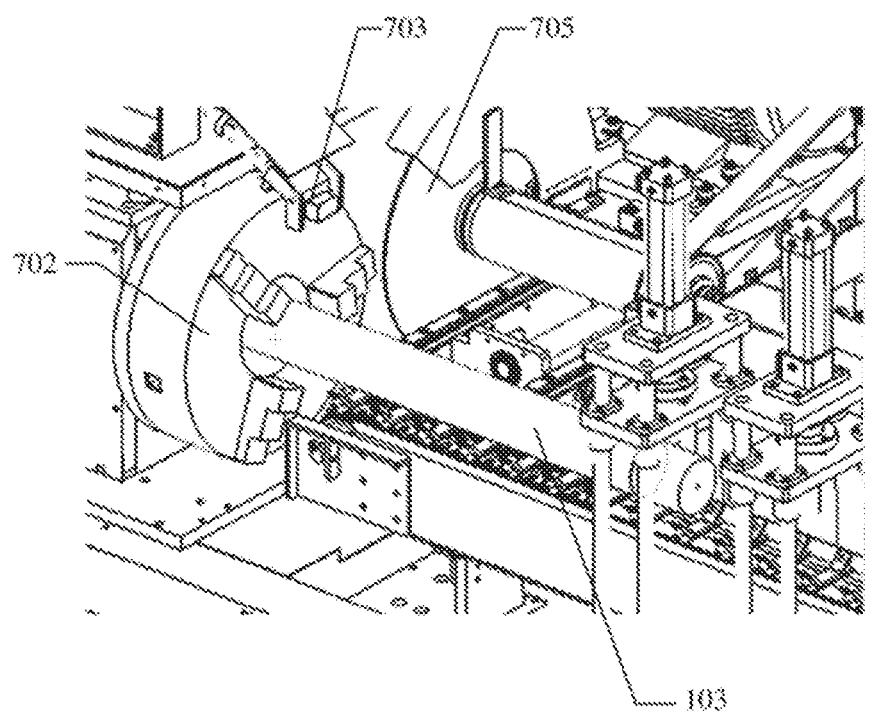
FIG. 8 is a schematic diagram of an embodiment of the present disclosure.

In an embodiment of the present disclosure, the out diameter of the rod workpiece 103 is measured by a laser distance finder. As shown in FIG. 7, a laser distance finder 701 may be disposed above the front of a chuck 702 to measure a set of outer diameters of the rod workpiece 103. The master controller calculates an average diameter of the out diameters of the rod workpiece 103 and calculates a cut-off length based on the average diameter, a pre-stored density of the rod workpiece and a preset cut-off weight (namely the segment weight). The chuck 702 locks the rod workpiece after the rod workpiece has been pushed to a preset position by the push rod 301 under the control of the master controller, and then the rod workpiece is cut by the grinding wheel.

In an embodiment of the present disclosure, the out diameter of the rod workpiece 103 is measured by a laser distance finder. As shown in FIG. 7, a laser distance finder 101 may be disposed above the front of a chuck 702 to measure a set of outer diameters of the rod workpiece 103. The master controller calculates an average diameter of the out diameters of the rod workpiece 103 and calculates a cut-off length based on the average diameter, a pre-stored density of the rod workpiece and a preset cut-off weight (namely the segment weight). The chuck 702 locks the rod workpiece after the rod workpiece has been pushed to a preset position by the push rod 301 under the control of the master controller, and then the rod workpiece is cut by the grinding wheel 705.

In the embodiment of the disclosure, the grinding wheel cutting apparatus cuts the rod workpiece to a preset core diameter and does not cut off the rod workpiece. In other words, the grinding wheel does not pass through the center of the rod workpiece, so as to avoid particles and dusts entering into a shrinkage hole of the rod workpiece in the cutting process, thereby avoiding a scrap of the precision cast piece caused by the particles and dusts. In order to prevent the grinding wheel from contacting the shrinkage hole in the cutting process and realize the above cutting method, the cutting apparatus circularly cuts the rod workpiece in a mutual manner, that is, the rod workpiece is rotated while being cut, so as to realize a circular cutting, and the cut depth is controlled.

Figure 9:
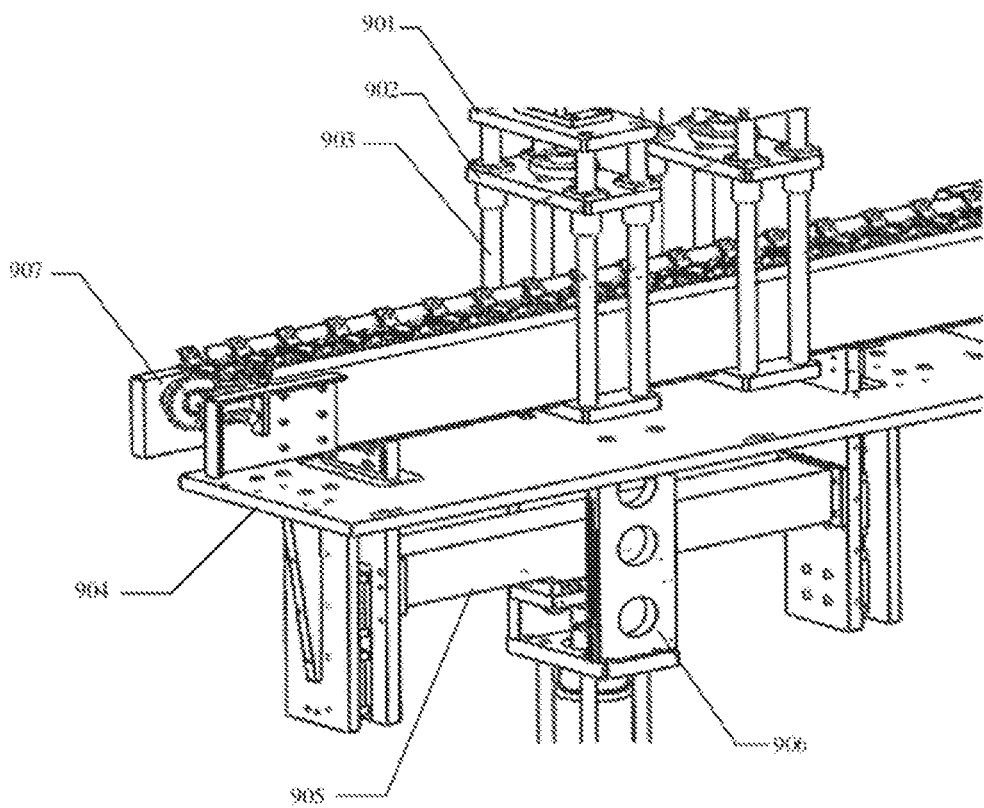
FIG. 9 is a schematic diagram of a support bracket according to an embodiment of the present disclosure.

In order to avoid the contamination caused by the grinding wheel passing through the shrinkage hole as described above, in the embodiment of the disclosure, the cutting apparatus circularly cuts the rod workpiece in a mutual manner. In addition, in order to avoid the shrinkage hole from being exposed to the cutting environment, the cutting apparatus cuts a single rod workpiece by multiple cuttings and in a non-cut-through way. However, the rod workpiece that is not straight may sway (bounce) during the rotating-and-cutting process, which may cause the rod workpiece to break off or hinder the cutting process, and may result in accidents. In view of this, the cutting apparatus in an embodiment of the disclosure may further comprise a flexible supporting device configured to flexibly support a part of the rod workpiece that has been cut, so as to prevent the part from being broken off by the rotation or hindering the subsequent cutting process. The flexible supporting device may comprise a supporting bracket, a V-shaped plate, a floating spring and a first hydraulic cylinder. As shown in FIG. 9, the supporting bracket may comprise a cylinder mounting plate 901, an up-down moving plate 902, four guide rods 903 and a bottom plate 904. The cylinder mounting plate 901 and the up-down moving plate 902 may be all mounted to the four guide rods 903, the first hydraulic cylinder may be mounted on the cylinder mounting plate 901, and the up-down moving plate 902 may be arranged under the cylinder mounting plate 901. The first hydraulic cylinder applies force to the up-down moving plate 902 via the top plate 911. The floating spring may be arranged between the top plate 911 and the up-down moving plate 902.

In this embodiment, the cylinder mounting plate 901, the up-down moving plate 902 and the guide rods 903 may be disposed on the bottom plate 904 to constitute an upper supporting bracket. A chain wheel for transferring the rod workpieces may be disposed on the bottom plate 904 and pass through the upper supporting bracket. The cylinder mounting plate of the upper supporting bracket may be provided with a first hydraulic cylinder for driving the up-down moving plate 902 to move up and down. The rod workpiece to be cut is placed on the chain wheel 907, the chain wheel 907 supports the rod workpiece and transfers the rod workpiece to the next processing station after cutting of the rod workpiece is finished. The supporting device in this embodiment may further comprise a bottom plate 904, a cross beam 905 and a vertical plate 906, which constitute a chain wheel supporting platform for supporting the chain wheel 907.

Figure 10:
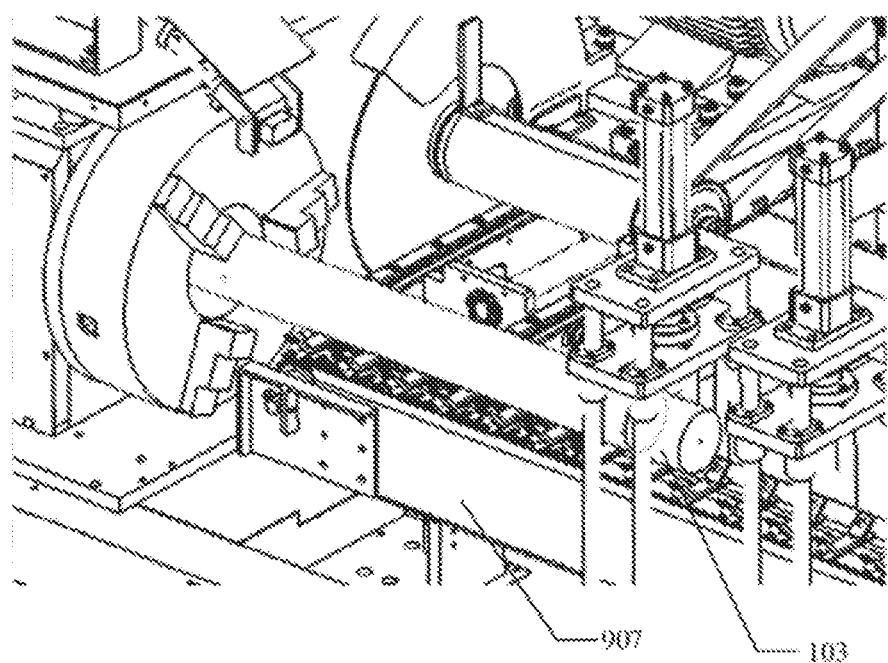
FIG. 10 is a schematic diagram of an embodiment of the present disclosure.

As shown in FIG. 10, in cutting the rod workpiece, the rod workpiece is inserted into the chuck 702, with its front end portion being placed on the chain wheel 907 to be supported and conveyed by the chain wheel 907.

Figure 11:
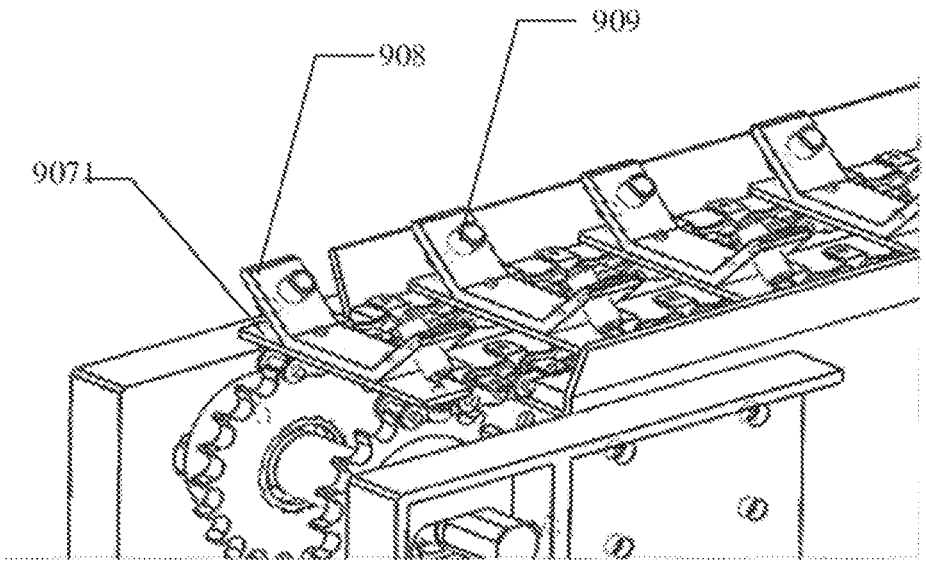
FIG. 11 is a schematic diagram of an embodiment of the present disclosure.
Figure 12:
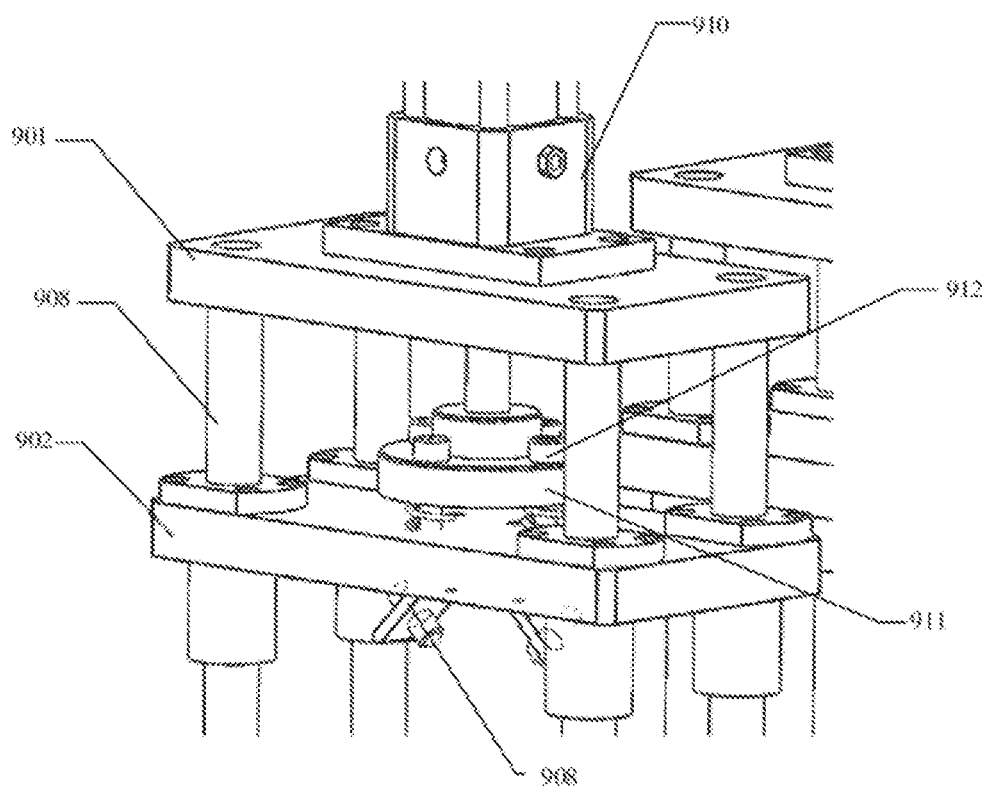
FIG. 12 is a schematic diagram of an embodiment of the present disclosure.

As shown in FIG. 11, a chain plate 9071 of the chain wheel 907 may be provided with a V-shaped plate 908 on which a floating stopper screw 909 is mounted. The head of the floating stopper screw 909 may be elastic so as to rotatably hold the rod workpiece in all directions. As shown in FIG. 12, the flexible supporting device may comprise a floating spring 912 installed between the hydraulic cylinder 910 and the top plate 911 by a screw connection with a certain amount of compression reserved. The chain wheel 907 may be installed on the bottom plate 904 of the flexible supporting device.

Figure 13:
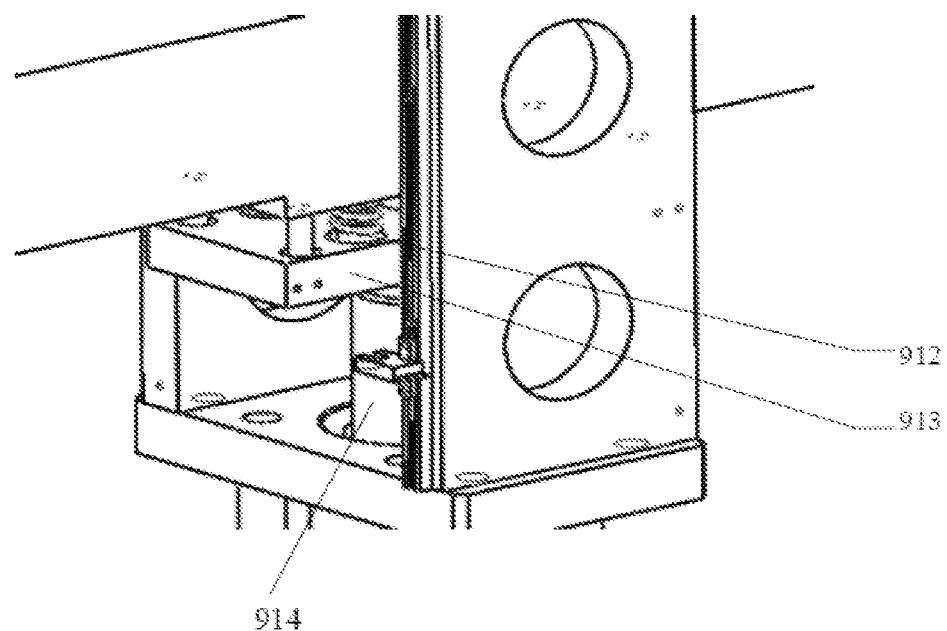
FIG. 13 is a schematic diagram of an embodiment of the present disclosure.

As shown in FIG. 13, a second hydraulic cylinder 914 may be provided under the bottom plate 904. The second hydraulic cylinder 914 may be installed under the bottom plate 904 through a vertical plate 906 and apply force to the bottom plate 904 through a cylinder top plate 913. Another floating spring may be provided between the top plate 913 and the bottom plate 904 and acts as a buffer when the rod workpiece is lifted, so as to reduce vibration and provide flexible support for the rod workpiece. In the process of pressing and breaking the rod workpiece into rod workpiece segments after the cutting process is completed, the hydraulic cylinder 910 applies a down-force to the up-down moving plate 902 and the hydraulic cylinder below the bottom plate 904 applies an up-force to the top plate 913 to clamp the rod workpiece 103 through the V-shaped plate 908, so as to provide flexible support for the rod workpiece.

In an embodiment, another V-shaped plate 908 may be installed below the up-down moving plate 902 to coordinate with the V-shaped plate on the conveyor belt of the chain wheel 907 to prevent the rod workpiece from swaying. In the embodiment, the flexible supporting device provides flexible support for the rod workpiece through the upper and lower floating springs, and the flexible supporting device moves synchronously with the rod workpiece, allowing for stable cutting of the rod workpiece as supported.

Figure 14:
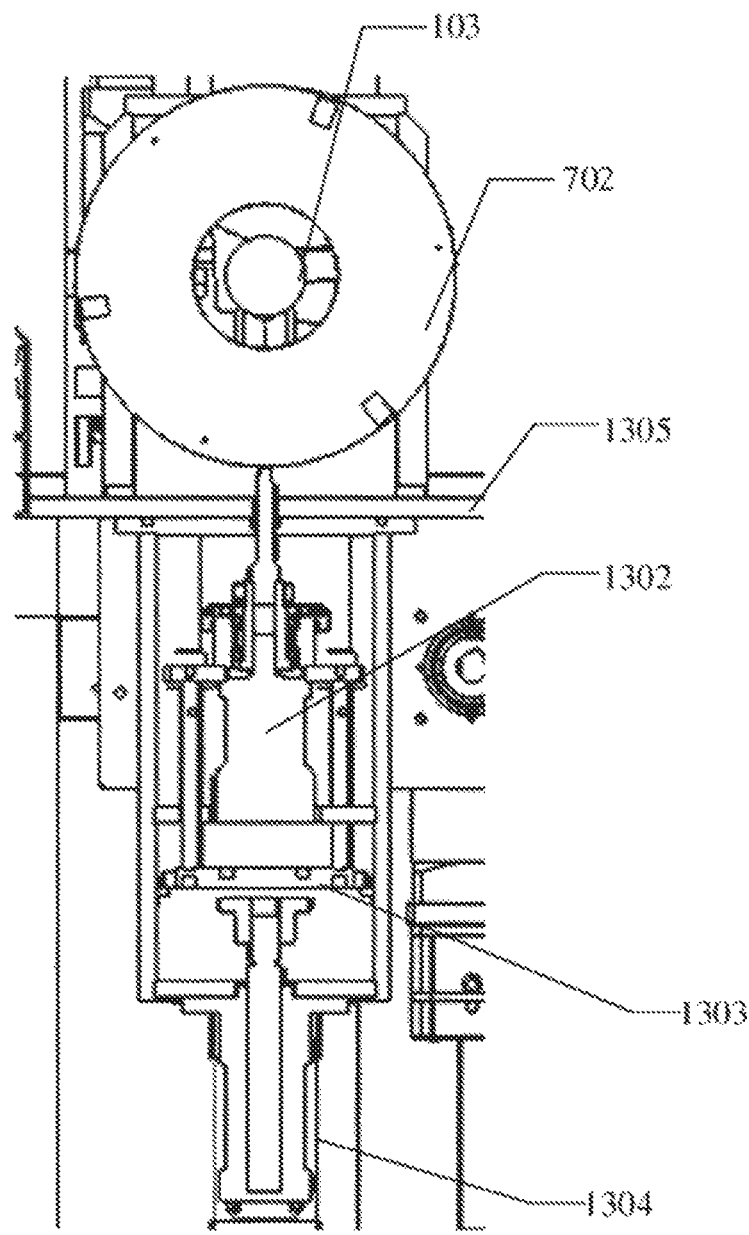
FIG. 14 is a cross-sectional view of an automatic chuck locking device according to an embodiment of the present disclosure.
Figure 15:
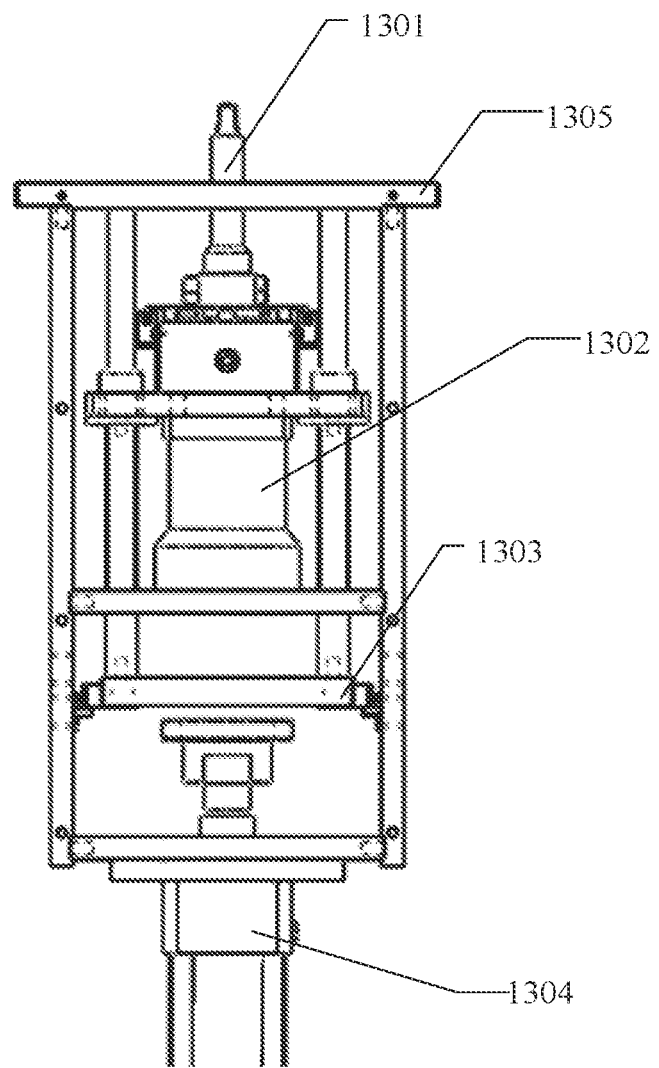
FIG. 15 is a front view of the automatic chuck locking device in an embodiment of the present disclosure.
Figure 16:
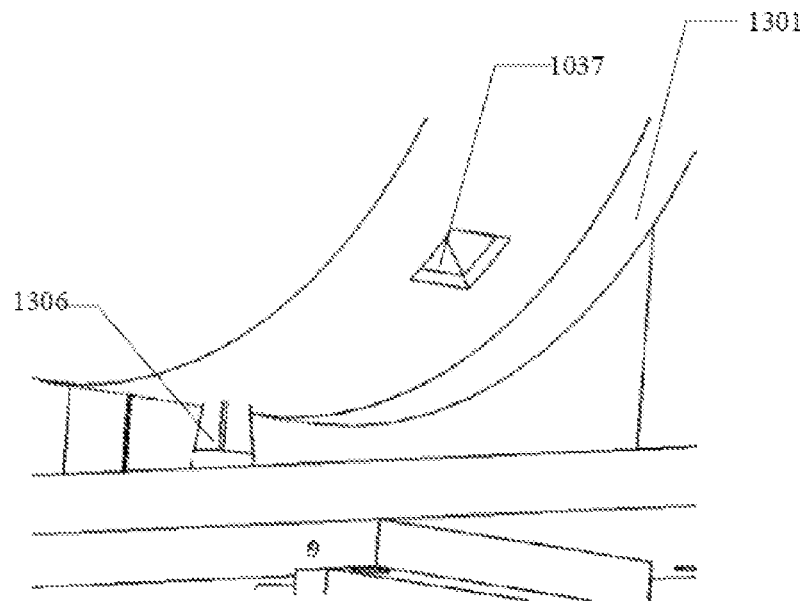
FIG. 16 is a partial schematic view of a mechanical chuck of the automatic chuck locking device in an embodiment of the present disclosure.

In an embodiment of the present disclosure, the grinding wheel cutting apparatus may further comprise an automatic chuck locking device, whose cross-sectional view is shown in FIG. 14. In the embodiment, the automatic chuck locking device may comprise a mechanical chuck 1301, a hydraulic motor 1302, a lifting mechanism 1303, a chuck key 1306, and a lifting cylinder 1304. The mechanical chuck 1301 may be mounted and fixed to a chuck mounting bracket 1305. The hydraulic motor 1302, the lifting mechanism 1303, and the lifting cylinder 1304 may be mounted below the chuck mounting bracket 1305. The lifting of the lifting mechanism is controlled by the lifting cylinder 1304 to insert the chuck key 1306 into the keyhole of the mechanical chuck 1301, and the rotation of the chuck key 1306 within the chuck keyhole is controlled by the hydraulic motor to lock or loosen the chuck, thereby achieving the automatic locking and loosening of the mechanical chuck, eliminating the need in the related art to manually lock and loosen the mechanical chuck, improving efficiency of the mechanical chuck, and reducing the labor intensity of the operators. In addition, as the hydraulic motor is controlled by a computer device to control the locking of the mechanical chuck, sufficient locking force of the chuck can be achieved. FIG. 15 is a front view of the automatic chuck locking device provided in the embodiment. FIG. 16 is a partial schematic view of the automatic chuck locking device provided in the embodiment. The chuck key 1306 passes through a mounting plate of the chuck mounting bracket 1305. The chuck keyhole 1307 is aligned with the chuck key 1306 by controlling the chuck to rotate, and the locking or loosening of the mechanical chuck 1301 is controlled by the chuck key 1306.

In the embodiment, the mechanical chuck 1301 is used in replacement of the hydraulic chuck commonly used in the related art whose inner hole is too small, so that the cutting apparatus in the embodiment can meet more various requirements for the cutting and can be more applicable.

In the embodiment, the locking of the chuck involves two operations: rotating of the chuck key, and moving of the chuck key into or off the chuck keyhole. In order to realize these two operations, the chuck key needs to cooperate with a rotating mechanism and a lifting mechanism. In an embodiment, the automatic chuck locking device adopts a combination of the hydraulic motor and the lifting cylinder, in which a torsion of the hydraulic motor is converted into a pressure to control the locking degree of the chuck. The hydraulic motor is controlled by a pressure sensor to lock the chuck. The lifting cylinder drives the chuck key to move into or off the chuck.

Figure 17:
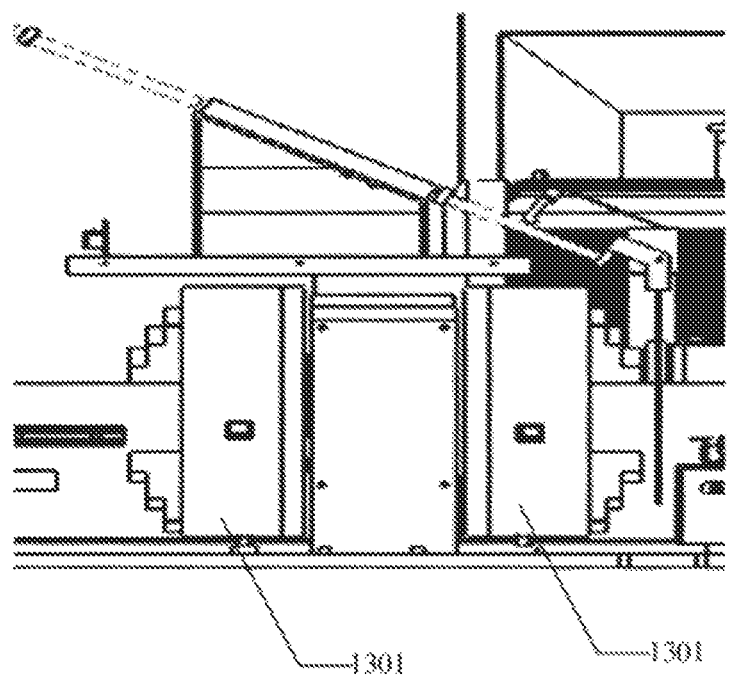
FIG. 17 is a partial schematic view of the grinding wheel cutting apparatus with two mechanical chucks in an embodiment of the present disclosure.

In addition, as the automatic chuck locking mechanism comprises the mechanical chuck instead of a hydraulic chuck commonly used in the related art to fix the rod workpiece, in another embodiment of the present disclosure, the cutting apparatus may be provided with two sets of automatic chuck locking mechanisms to support and hold the rod workpiece being cut more stably by two mechanical chucks. FIG. 17 is a partial schematic view of the cutting apparatus with two mechanical chucks 1301.

In an embodiment of the disclosure, after the rod workpiece is cut into segments, the rod workpiece is transferred by the chain wheel to the subsequent operating station to be pressed and broken off. The cutting apparatus in the embodiment may further comprise a floating roller conveying mechanism arranged at a station where a pressing/breaking operation is performed. The floating roller conveying mechanism ensures safety of the rollers and sufficient resilience in pressing and breaking the rod workpiece, and the stability over long-term operation. In contrast, the conventional roller conveying mechanism is lifted by air cylinders, therefore the cost is high, and the positioning of the workpiece is inaccurate. The roller conveying mechanism in the embodiment of the present disclosure ensures the smooth movement of the rod workpieces, ensures safety of the rollers and the relevant mechanism in the pressing/breaking operation, and ensures accuracy of the pressing/breaking position.

Figure 18:
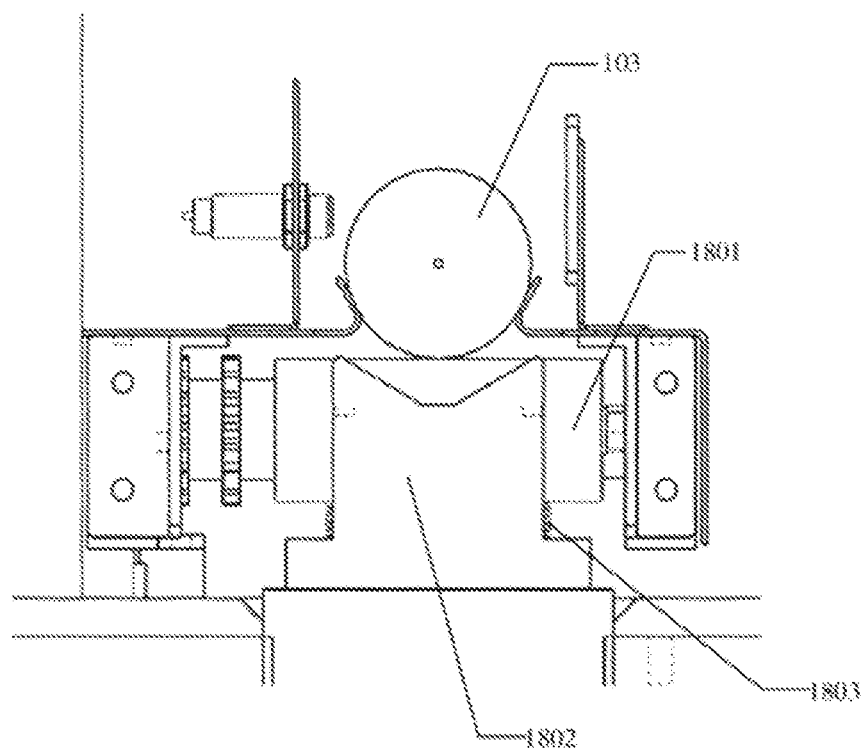
FIG. 18 is a side view of a floating roller conveying mechanism in an embodiment of the present disclosure.
Figure 19:
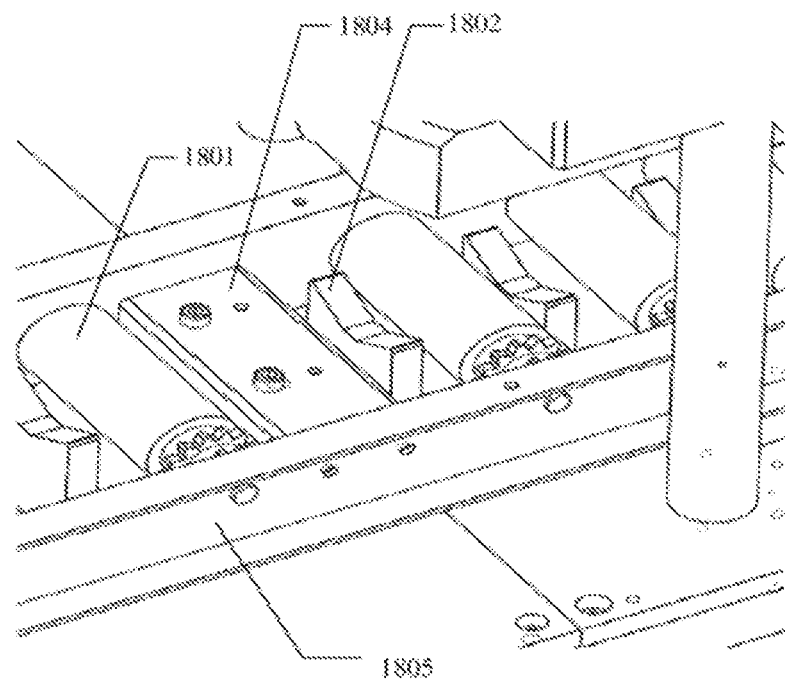
FIG. 19 is a partial schematic diagram of a floating roller conveying mechanism in an embodiment of the present disclosure.
Figure 19A:
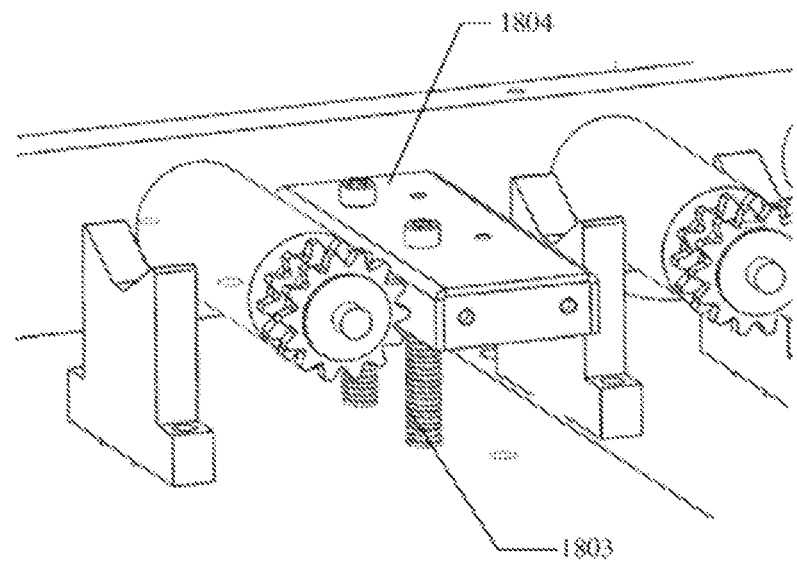
FIG. 19A is a partial schematic diagram of the floating roller conveying mechanism in an embodiment of the present disclosure.

FIG. 18 is a side view of the floating roller conveying mechanism in an embodiment of the present disclosure. The floating roller conveying mechanism may comprise a roller 1801, a V-shaped pressing block 1802, and a compression spring 1803. The rod workpiece 103 is conveyed by the rotation of the roller 1801. The V-shaped pressing block 1802 provides stable support for the rod workpiece 103. FIGS. 19 and 19A are partial schematic diagrams of the floating roller conveying mechanism in the embodiment. A connecting plate 1804 and a longitudinal connecting plate 1805 constitute a support member of the floating roller conveying mechanism. In the embodiment, the connecting plate 1804 may be connected to a base for bearing the floating roller conveying mechanism by a screw. In the embodiment, the spring 1803 may be sleeved on the screw, so as to provide flexibility for the floating roller conveying mechanism, thereby realizing the floating roller conveying in the embodiment.

Figure 20:
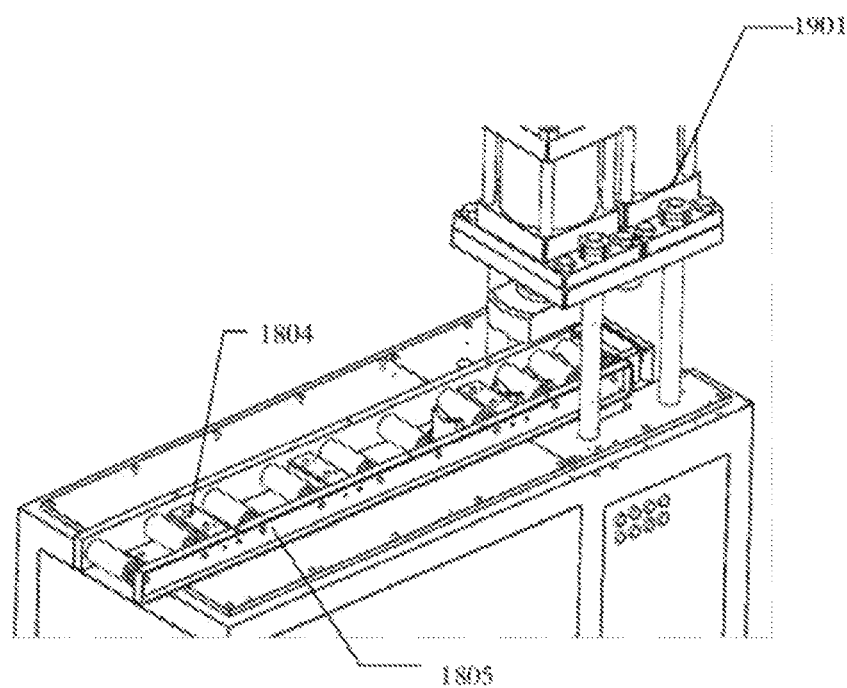
FIG. 20 is a schematic diagram of an embodiment of the present disclosure.
Figure 21:
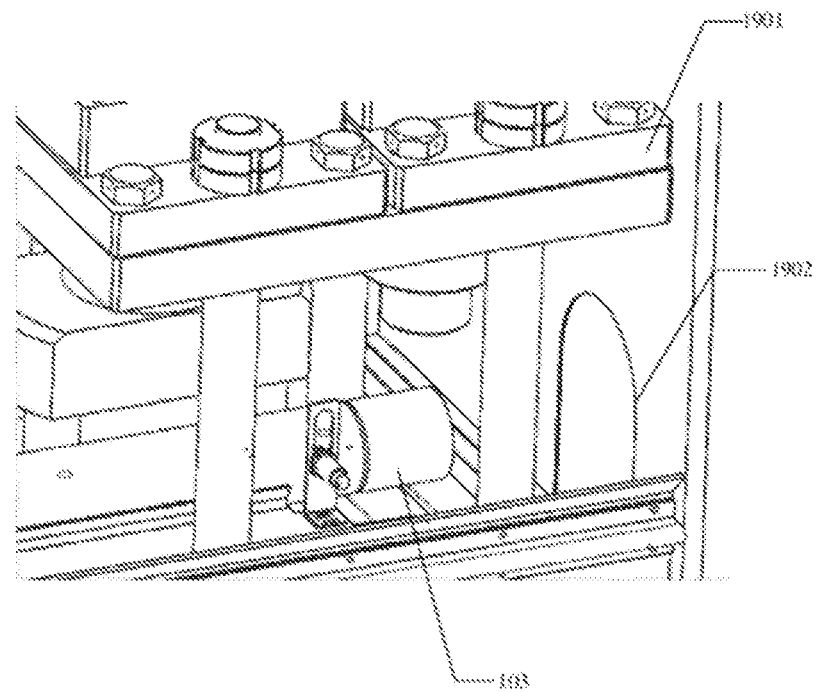
FIG. 21 is a schematic diagram of an embodiment of the present disclosure.

After the rod workpiece is cut, the controller controls the floating roller conveying mechanism to transfer the cut rod workpiece to a designated position where the cut rod workpiece is clamped and fixed by a clamping device. As shown in FIG. 20, the rod workpiece is clamped by the clamping device 1901, and then punched by a pressing/breaking device to be broken off at an annular cut-out formed by cutting operation. As shown in FIG. 18, in an embodiment of the present disclosure, the cutting apparatus may be provided with a V-shaped carrier 1802. The controller controls the floating roller conveying mechanism to transfer the rod workpiece that has been cut to the carrier 1802, and to make the annular cut-out located outside the carrier. As shown in FIG. 21, in an embodiment of the present disclosure, the cutting apparatus may be provided with a discharge port 1902. The controller controls the floating roller conveying mechanism to transfer the cut rod workpiece to the discharge port 1902, and makes the annular cut-out located outside the discharge port, so that the rod workpiece 103 is broken off at the annular cut-out when being punched by the pressing/breaking device.

Figure 22:
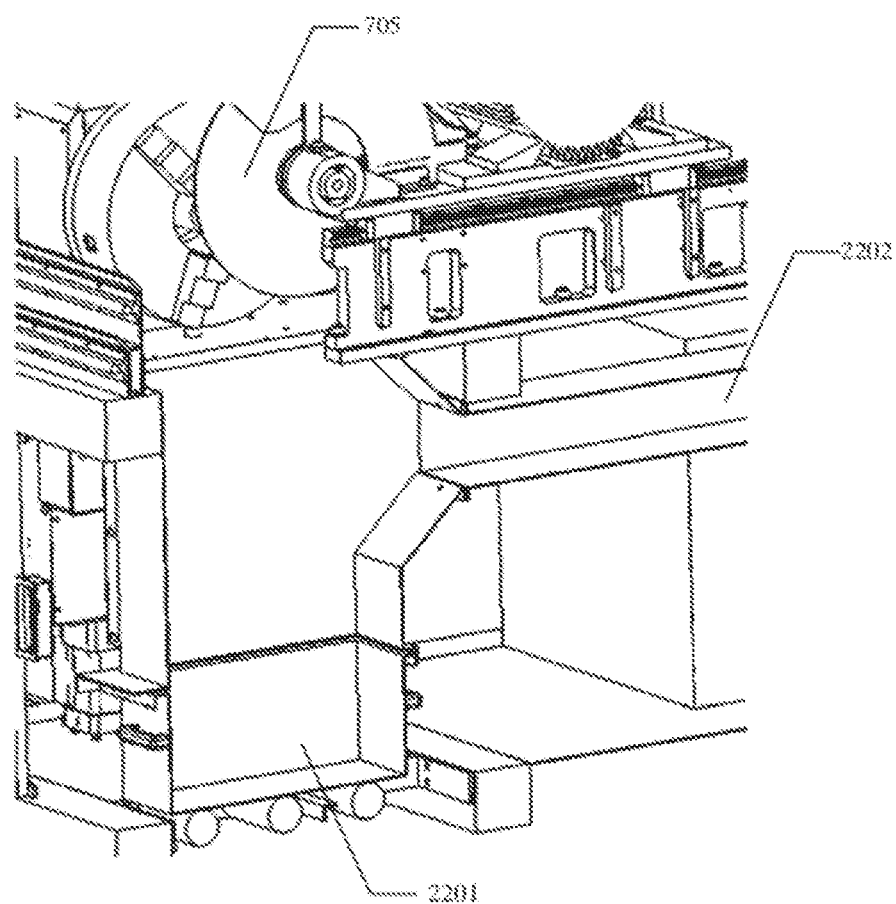
FIG. 22 is a schematic view of a dust collector according to an embodiment of the present disclosure.

In addition, in an embodiment of the present disclosure, the grinding wheel cutting apparatus may be further provided with a fume duct 2202 and a particle collecting device 2201. The particle collecting device may be arranged at a position where the rod workpiece is cut, so as to collect particles generated in the cutting operation. As shown in FIG. 22, in an embodiment of the present disclosure, the particle collecting device 2201 may be located below the grinding wheel, and the fume duct 2202 may be located above the particle collecting device 2201.

In the related art, the collected fume and particles are not separated but are discharged together from the duct, causing pollution to the environment. In an embodiment of the disclosure, a fume/particle collecting device is provided for collecting fume and particles generated in cutting the rod workpieces by the grinding wheel cutting apparatus. The fume/particle collecting device may comprise a fume/particle collecting box 2201 and a fume duct 2202. The fume/particle collecting box 2201 may be arranged below a tangent line passing a point where the grinding wheel of the cutting apparatus and the rod workpiece contact, for collecting the particles generated by the cutting apparatus. The fume duct 2202 may be disposed between the fume/particle collecting box 2201 and the grinding wheel, and may be in communication with the dust collecting box 2201, for discharging the generated fume.

Figure 22A:
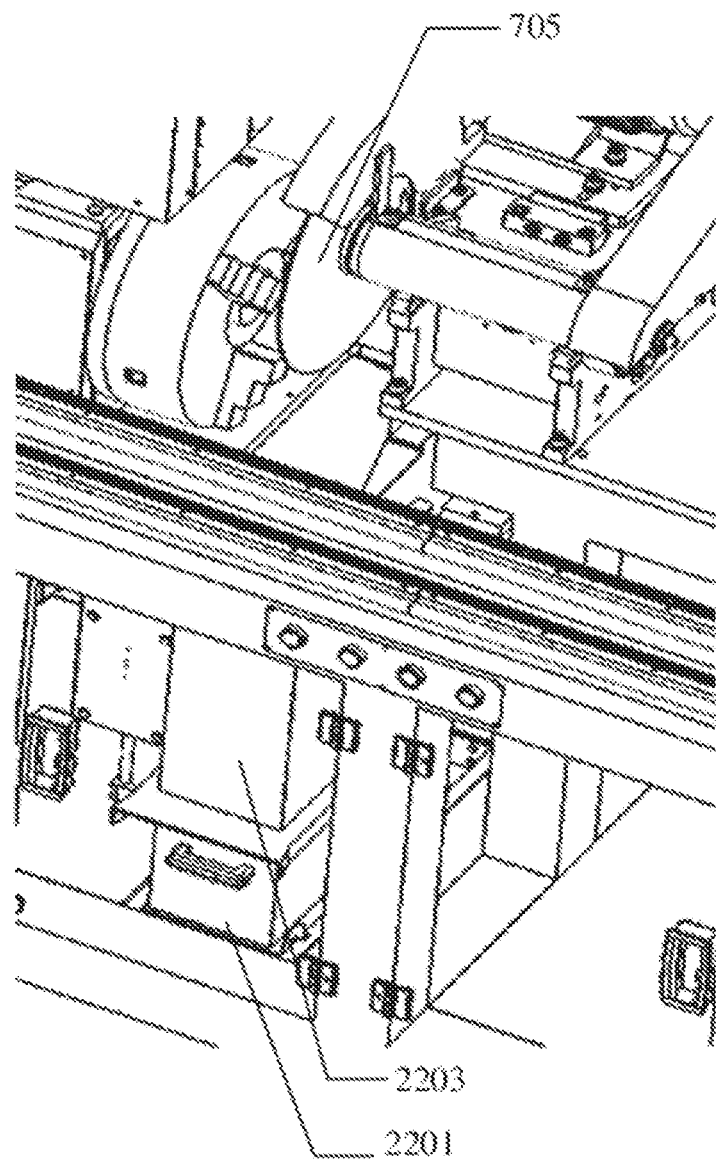
FIG. 22A is a schematic view of the dust collector according to an embodiment of the present disclosure.

As shown in FIG. 22A, in an embodiment of the present disclosure, the fume/particle collecting device may further comprise a housing 2203 in which the fume/particle collecting box 2201 is mounted as a drawer structure, so as to facilitate the collection of the fume and particles.

In this embodiment, the fume duct 2202 and the particle collecting device 2201 are effectively combined. The fume duct 2202 may be provided on the upper part of the particle collecting device 2201. Since the density of the fume is different from that of the particles, the fume is discharged through the fume duct 2202, and the particles deposit to the bottom of the particle collecting device 2201 by their weight. So the fume and the particles are discharged hierarchically, the period for replacing a filter cartridge of the cutting apparatus is prolonged, the using cost of the filter cartridge is reduced, and the collection of particles is more convenient. In addition, for high temperature alloys, the scarcity of strengthening elements makes sorting and recycling scrap material of the alloys by specifications more important. In this embodiment, collecting boxes with the drawer structure are provided to collect particles of different specifications respectively, making is possible to sort and collect the particles according to specifications of the alloys, which is favorable for recycling.

The grinding wheel cutting apparatus provided by the present disclosure improves the operation efficiency, reduces the labor intensity, and improves the quality of the product. Moreover, the components of the grinding wheel cutting apparatus such as the automatic feeder, the chuck locking mechanism, the flexible supporting device, and the fume/particle collecting mechanism and the like, can be independently designed as individual modules, and can be assembled by connectors such as screws, thereby providing a more convenient and intelligent cutting apparatus.

Figure 23:
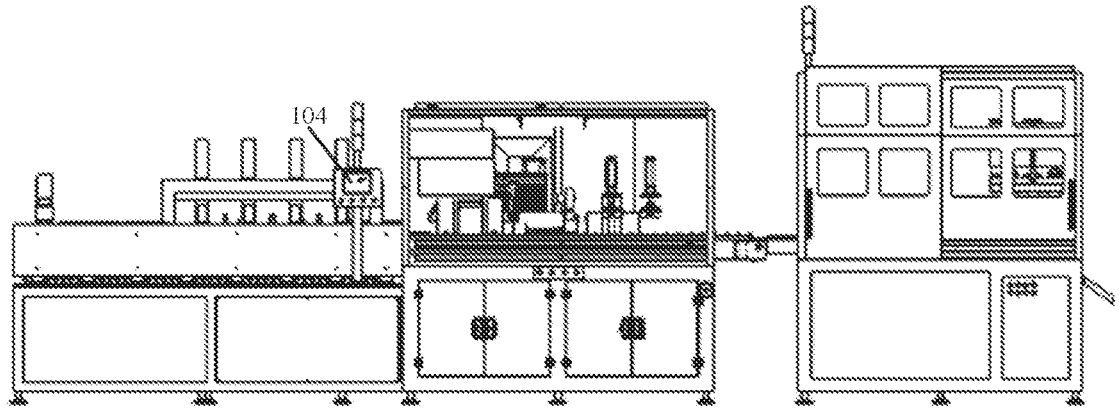
FIG. 23 is an overall schematic view of the grinding wheel cutting apparatus in an embodiment of the present disclosure.

In an embodiment of the disclosure, the grinding wheel cutting apparatus may further comprise a plurality of housings for accommodating the mechanisms and modules described above respectively. FIG. 23 is an overall schematic view of the cutting apparatus according to an embodiment of the present disclosure.

The cutting of metal materials usually involves heavy labor, high pollution, frequent accidents and low degree of automation. However, with the fully-automatic, fully-enclosed grinding wheel cutting apparatus provided in the present disclosure, the safety and efficiency of the grinding wheel cutting can be improved, labor intensity and occupational injuries can be reduced, precision of workpiece can be improved by intelligent process control, and contamination to the workpiece in the machining process can be avoided.

Figure 24:
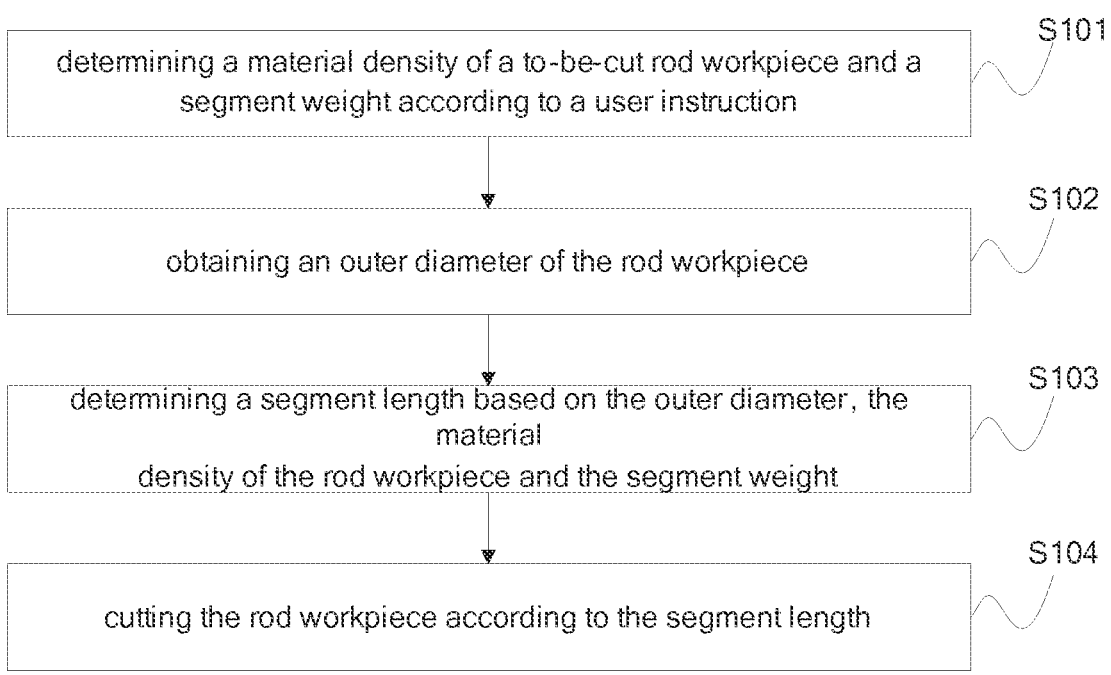
FIG. 24 is a flowchart of a cutting method according to an embodiment of the present disclosure.

It is another aspect of the disclosure to provide a rod workpiece cutting method for cutting a rod workpiece by the grinding wheel cutting apparatus of the present disclosure, as shown in FIG. 24, the method may comprise:

step S101: determining a material density of a rod workpiece to be cut and a segment weight of a segment to be cut off from the rod workpiece according to a user instruction;

step S102: obtaining an outer diameter of the rod workpiece;

step S103: determining a segment length of the segment based on the outer diameter, the material density of the rod workpiece and the segment weight;

step S104: cutting the rod workpiece according to the segment length.

With the method provided in an embodiment of the present disclosure, the cutting and blanking are controlled by the cutting apparatus in a quantitative manner, and the weight of each rod workpiece segment cut from the rod workpiece is precisely controlled, therefore the weight deviation of the rod workpiece segments caused by irregularity of the cast piece can be suppressed, and the requirements on the pressing/breaking equipment can be reduced.

Those skilled in the art should understand that the embodiments of this disclosure can be provided as methods, systems or computer program products. Therefore, this disclosure may be implemented in the form of fully-hardware embodiments, fully-software embodiments, or combined software-hardware embodiments. In addition, this disclosure may employ the form of a computer program product implemented on one or more computer storage medium (including but not limited to disk memory, CD-ROM, and optical memory) containing computer programming code.

This disclosure is set forth by referring to flow charts and/or block diagrams for the methods, devices (systems), and computer program products of the embodiments. It should be understood that each process and/or block of the flow charts and/or block diagrams as well as combinations of the processes and/or boxes of the flow charts and/or block diagrams can be realized by computer program instructions. These computer program instructions can be provided to general-purpose computers, special-purpose computers, embedded processors or the processors of other programmable data processing devices to produce a machine, so that an apparatus for implementing the functions designated in one or more processes of the flowcharts and/or one or more blocks of the block diagrams can be produced by the instructions executed by the processor of the computer or other programmable data processing device.

These computer program instructions can also be stored in a computer-readable storage medium which can guide a computer or other programmable data processing device to operate in a particular way, so that an article of manufacture comprising an instruction apparatus can be produced by the instructions stored in the storage medium, with the instruction apparatus implementing the functions designated in one or more processes of the flowcharts and/or one or more blocks of the block diagram.

These computer program instructions may also be loaded onto a computer or other programmable data processing device to make the computer or other programmable data processing device perform a sequence of computer-implemented operations, so that the instructions executed by the computer or other programmable data processing device realize one or more processes of the flowcharts and/or one or more blocks of the block diagram.

The principles and implementations of the present disclosure have been described above by means of some embodiments. It should be understood that the embodiments are meant to facilitate understanding of the principles of the present disclosure, and those skilled in the art can make any modifications based on the teachings of this disclosure. This specification shall not be construed as any limitation to the present disclosure.

What is claimed is:

1. A grinding wheel cutting apparatus comprising a first laser distance sensor, a master controller and a grinding wheel apparatus, wherein
   the grinding wheel apparatus comprises a grinding wheel, a flange, a pull rod and a spindle;
   the grinding wheel is mounted on one side of the flange, and the other side of the flange is a tapered bucket, the tapered bucket includes a buckle slot, and an end of the pull rod includes a T-shaped buckle through which the pull rod is matched with the buckle slot of the tapered bucket;
   the pull rod passes through the spindle, a pull rod head of the pull rod is fixed to one end of the spindle, the tapered bucket is inserted into the spindle from the other end of the spindle, and the buckle slot is engaged with the T-shaped buckle of the pull rod in the spindle to fix the flange on which the grinding wheel is mounted to the other end of the spindle;
   the first laser distance sensor is communicatively coupled to the master controller;
   the first laser distance sensor is configured to obtain an outer diameter of a rod workpiece;
   the master controller is configured to transmit the outer diameter of the rod workpiece to an external device, and receive a segment length of a segment to be cut off from the rod workpiece which is determined by the external device based on the obtained outer diameter, a material density of the rod workpiece and a segment weight;
   the master controller is configured to perform a control to circularly cut the rod workpiece by the grinding wheel, according to the segment length and a reserved core diameter, and finish the cutting when the cut depth reaches a preset depth, with the grinding wheel not passing through the center of the rod workpiece.

2. The grinding wheel cutting apparatus according to claim 1, further comprising a second laser distance sensor configured to obtain a cut depth of the rod workpiece.

3. The grinding wheel cutting apparatus according to claim 2, further comprising a grinding wheel pressing plate with an internal thread;
   wherein, the one side of the flange includes an end portion having an external thread to match the internal thread of the grinding wheel pressing plate, and the grinding wheel is connected to the one side of the flange by the grinding wheel pressing plate.

4. The grinding wheel cutting apparatus according to claim 1, wherein the grinding wheel is connected to the one side of the flange by a thread connection.

5. The grinding wheel cutting apparatus according to claim 1, wherein the pull rod head is fixed to one end of the spindle by bolts.

6. The grinding wheel cutting apparatus according to claim 1, wherein at least one spring is provided between the pull rod head and the spindle.

7. A rod workpiece cutting method for cutting a rod workpiece with a grinding wheel cutting apparatus, wherein
   the grinding wheel cutting apparatus comprises a first laser distance sensor, a master controller and a grinding wheel apparatus;
   the grinding wheel apparatus comprises a grinding wheel, a flange, a pull rod and a spindle;
   the grinding wheel is mounted on one side of the flange, and the other side of the flange is a tapered bucket, the tapered bucket includes a buckle slot, and an end of the pull rod includes a T-shaped buckle through which the pull rod is matched with the buckle slot of the tapered bucket;
   the pull rod passes through the spindle, a pull rod head of the pull rod is fixed to one end of the spindle, the tapered bucket is inserted into the spindle from the other end of the spindle, and the buckle slot is engaged with the T-shaped buckle of the pull rod in the spindle to fix the flange on which the grinding wheel is mounted to the other end of the spindle;
   the first laser distance sensor is communicatively coupled to the master controller;
   the first laser distance sensor is configured to obtain an outer diameter of the rod workpiece;
   the master controller is configured to transmit the outer diameter of the rod workpiece to an external device, and receive a segment length of a segment to be cut off from the rod workpiece which is determined by the external device based on the obtained outer diameter, a material density of the rod workpiece and a segment weight;
   the master controller is configured to perform a control to circularly cut the rod workpiece by the grinding wheel, according to the segment length and a reserved core diameter; and
   the rod workpiece cutting method comprises:
   determining the material density of the rod workpiece and the segment weight according to a user instruction;
   obtaining the outer diameter of the rod workpiece;
   determining the segment length based on the outer diameter, the material density of the rod workpiece and the segment weight; and
   circularly cutting the rod workpiece, according to the segment length and the reserved core diameter, and finishing the cutting when the cut depth reaches a preset depth, with the grinding wheel not passing through the center of the rod workpiece.

8. The rod workpiece cutting method according to claim 7, further comprising:
   obtaining a cut depth of the rod workpiece; and
   determining a compensation depth for the next cut based on the obtained cut depth and a prescribed compensation algorithm.

* * * * *